(12) United States Patent
Ikawa et al.

(10) Patent No.: US 7,873,867 B2
(45) Date of Patent: Jan. 18, 2011

(54) POWER SAVING METHOD IN NAS AND COMPUTER SYSTEM USING THE METHOD

(75) Inventors: Hirofumi Ikawa, Yokohama (JP); Takeshi Kitamura, Yokohama (JP); Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 402 days.

(21) Appl. No.: 12/029,043

(22) Filed: Feb. 11, 2008

(65) Prior Publication Data

US 2009/0031154 A1 Jan. 29, 2009

(30) Foreign Application Priority Data

Jul. 27, 2007 (JP) .............................. 2007-195613

(51) Int. Cl.
*G06F 11/00* (2006.01)
(52) U.S. Cl. .............................. 714/9; 714/14; 713/300; 713/320
(58) Field of Classification Search ...................... 714/9, 714/13, 14
See application file for complete search history.

(56) References Cited

U.S. PATENT DOCUMENTS

| 7,171,524 | B2 | 1/2007 | Kobayashi et al. | |
| 7,240,152 | B2 * | 7/2007 | Nakayama et al. | 711/112 |
| 2003/0105767 | A1 * | 6/2003 | Sonoda et al. | 707/100 |
| 2003/0135782 | A1 * | 7/2003 | Matsunami et al. | 714/5 |
| 2005/0198433 | A1 * | 9/2005 | Kobayashi et al. | 711/112 |
| 2005/0210191 | A1 * | 9/2005 | Kobayashi et al. | 711/114 |
| 2007/0079063 | A1 * | 4/2007 | Mizuno | 711/112 |
| 2008/0244295 | A1 * | 10/2008 | Mizuno | 713/324 |

FOREIGN PATENT DOCUMENTS

JP 2005-267111 A 9/2005

OTHER PUBLICATIONS

Hewlett-Packard Corporation, Advanced Configuration and Power Interface Specification Revision 3.ob, retrieved from the Internet on Jul. 5, 2007 at http://www.acpi.info/DOWNLOADS/ACPIspec3Ob.pdf) online, Oct. 10, 2006.

* cited by examiner

*Primary Examiner*—Robert Beausoliel
*Assistant Examiner*—Elmira Mehrmanesh
(74) *Attorney, Agent, or Firm*—Sughrue Mion, PLLC

(57) ABSTRACT

Provided is a computer system which includes plurality of computers including a first, second, and third computers, and a storage device coupled to the plurality of computers via a network, in which: the first computer is configured to: access data in a storage area of the storage device; cut, based on settings information and loads on the plurality of computers, at least a part of electric power supplied to the first computer; and send, before cutting the at least a part of electric power supplied to the first computer, a takeover request to the second computer; and the second computer accesses the data within the storage area after receiving the takeover request. With the configuration as described above, power consumption in NAS is reduced.

2 Claims, 26 Drawing Sheets

| POWER SAVING LEVEL | NAS STATE | SUMMARY | POWER CONSUMPTION | RESUMPTION PERIOD |
|---|---|---|---|---|
| 0 | FULL-TIME OPERATION | PROVIDE SERVICE NONSTOP | LARGE ↕ SMALL | SHORT ↕ LONG |
| 1 | CPU SHUTDOWN | SHUT DOWN CPU ALONE IN ANTICIPATION OF FAILURE IN FULL-TIME OPERATING NAS | | |
| 2 | MEMORY SUSPEND | STORE STATE PRIOR TO SHIFT TO POWER SAVING MODE, AND THEN ENTER IN SLEEP STATE | | |
| 3 | SHUTDOWN CALLED Soft Off | OS IS SHUT DOWN AND HARDWARE RECEIVES MINIMUM SUPPLY OF ELECTRIC POWER | | |

*FIG. 4*

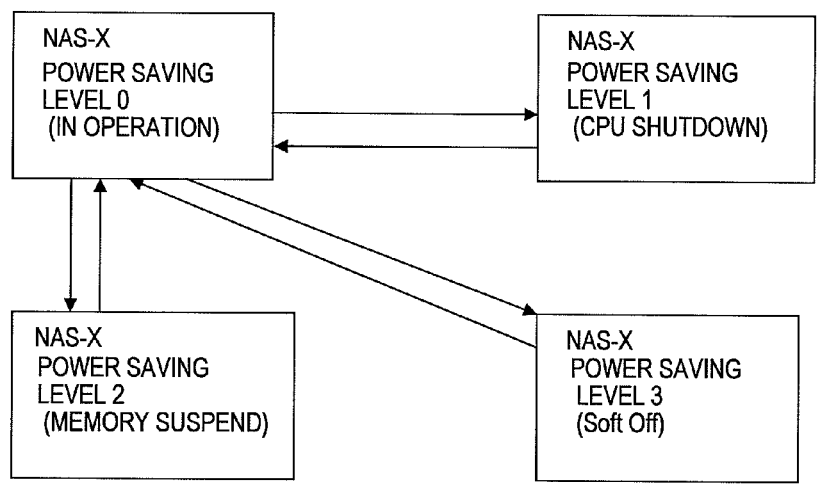

*FIG. 5*

COLLECTED INFORMATION TABLE

| TIME | INFORMATION TYPE | NAS-01 | NAS-02 | NAS-03 |
|---|---|---|---|---|
| h1h1:m1m1:s1s1 | CPU LOAD | 10 % | 1 % | 0 % |
| | I/O LOAD | 1 MB/s | 0.1 MB/s | 0 MB/s |
| | FILE ACCESS COUNT | 100 FILES | 100 FILES | NONE |
| h2h2:m2m2:s2s2 | CPU LOAD | 15 % | 5 % | 1 % |
| | I/O LOAD | 3 MB/s | 0.5 MB/s | 0.01 MB/s |
| | FILE ACCESS COUNT | 250 FILES | 40 FILES | 1 FILE |
| ~ | CPU LOAD | ~ | ~ | ~ |
| | I/O LOAD | | | |
| | FILE ACCESS COUNT | | | |
| hxhx:mxmx:sxsx | CPU LOAD | 70 % | 11 % | 0 % |
| | I/O LOAD | 12 MB/s | 1 MB/s | 0 MB/s |
| | FILE ACCESS COUNT | 1000 FILES | 110 FILES | NONE |
| ~ | CPU LOAD | ~ | ~ | ~ |
| | I/O LOAD | | | |
| | FILE ACCESS COUNT | | | |

Columns: 1201 (TIME), 1202 (INFORMATION TYPE), 1203 (NAS-01), 1204 (NAS-02), 1205 (NAS-03); table 1200.

FIG. 12

ADMINISTRATOR SETTING TABLE

| NAS | POWER SAVING LEVEL | POWER SAVING TIME | RESUME TIME |
|---|---|---|---|
| NAS-01 | 0 | - | - |
| NAS-02 | 1 | 23:00 | 05:00 |
| NAS-03 | 3 | auto | auto |

*FIG. 13*

SHUTDOWN SCHEDULE TABLE

| NAS | POWER SAVING LEVEL | POWER SAVING TIME | RESUME TIME |
|---|---|---|---|
| NAS-01 | 0 | - | - |
| NAS-02 | 1 | 23:00 | 05:00 |
| NAS-03 | 3 | 20:00 | 08:00 |

*FIG. 14*

POWER SAVING LEVEL POLICY TABLE

| POWER SAVING LEVEL | CONDITION |
|---|---|
| 0 | (X1< CPU LOAD <X2) AND (Y1< I/O LOAD <Y2) AND (Z1< FILE ACCESS COUNT <Z2) |
| 1 | (X3< CPU LOAD <X4) AND (Y3< I/O LOAD <Y4) AND (Z3< FILE ACCESS COUNT <Z4) |
| 2 | (X5< CPU LOAD <X6) AND (Y5< I/O LOAD <Y6) AND (Z5< FILE ACCESS COUNT <Z6) |
| 3 | (X7< CPU LOAD <X8) AND (Y7< I/O LOAD <Y8) AND (Z7< FILE ACCESS COUNT <Z8) |

*FIG. 15*

NAS MANAGEMENT TABLE

| | | NAS-01 | NAS-02 | NAS-03 |
|---|---|---|---|---|
| STATE | | POWER SAVING LEVEL 0 | POWER SAVING LEVEL 0 | POWER SAVING LEVEL 3 |
| FAILOVER PAIR | | NAS-02 | NAS-01 | — |
| PATH | FS1 | PATH A/ON | PATH D/OFF | PATH G/OFF |
| | FS2 | PATH B/OFF | PATH E/ON | PATH H/OFF |
| | FS3 | PATH C/ON | PATH F/OFF | PATH I/OFF |

FILE ACCESS INFORMATION TABLE

| FILE | ACCESS DATE/TIME | ACCESS TYPE | ACCESS SOURCE |
|---|---|---|---|
| mnt/FS2/HTML-2.html | 2007/05/05 16:40 | read | NAS-01 |
| mnt/FS2/bbb.txt | 2007/05/07 12:00 | read | Client A |
| : | : | : | : |

PRIORITY MODE POLICY TABLE

2300

| MODE | CONDITION |
|---|---|
| ALL-NODE OPERATION | (X1< CPU LOAD <X2) AND (Y1< I/O LOAD <Y2) AND (Z1< FILE ACCESS COUNT <Z2) |
| RELIABILITY-FIRST | (X3< CPU LOAD <X4) AND (Y3< I/O LOAD <Y4) AND (Z3< FILE ACCESS COUNT <Z4) |
| POWER SAVING-FIRST | (X5< CPU LOAD <X6) AND (Y5< I/O LOAD <Y6) AND (Z5< FILE ACCESS COUNT <Z6) |

PRIORITY MODE SCHEDULE TABLE

2400

| TIME | MODE |
|---|---|
| 10:00 ~ 17:00 | ALL-NODE OPERATION |
| 17:00 ~ 21:00 | RELIABILITY-FIRST |
| 21:00 ~ 03:00 | POWER SAVING-FIRST |
| 03:00 ~ 10:00 | RELIABILITY-FIRST |

POWER SAVING METHOD IN NAS AND COMPUTER SYSTEM USING THE METHOD

CLAIM OF PRIORITY

The present application claims priority from Japanese application JP2007-195613 filed on Jul. 27, 2007, the content of which is hereby incorporated by reference into this application.

BACKGROUND

A technology disclosed herein relates to a storage subsystem management method and, more particularly, to a method of reducing power consumption in NAS.

NAS stands for network attached storage, a known technology in which a storage system connected to a network is used as a shared disk by multiple client computers connected to the network. NAS is composed of a server which contains a network interface and the like, and a disk device which stores data. A server constituting NAS is called a NAS server or a NAS node (hereinafter, simply referred to as node).

The amount of power consumed by NAS in providing a file-sharing service is increasing. This results from the recent advance in computer performance and node duplication for redundancy which ensures the continuity of the service. There is a known technology for avoiding an increase in power consumption due to redundancy, which is called cold standby (see, for example, JP 2005-267111 A). Cold standby shuts down a standby node, and thus prevents power consumption from increasing in proportion to the number of nodes introduced.

Meanwhile, a technology for controlling computer power is also known. For example, an advanced configuration and power interface (ACPI) is a standard defined for enabling an operating system (OS) to manage the power of each component of a computer in cooperation with a basic input/output system (BIOS) (see Hewlett-Packard Corporation and four others, "Advanced Configuration and Power Interface Specification Revision 3.0b", retrieved from the Internet on Jul. 5, 2007 at http://www.acpi.info/DOWNLOADS/ACPIspec30b.pdf) online, Oct. 10, 2006. ACPI allows an OS to finely set and manage the power control function of each component.

SUMMARY

With cold standby, taking over of a service upon failure takes a long time because a standby node which has been shut down has to be activated after a failure occurs, and the reliability of the system is accordingly lowered. Also, takeover of a service requires NAS to have a cluster configuration. In other words, power consumption cannot be reduced in a set of nodes that do not form a cluster.

According to a representative invention disclosed in this application, there is provided a computer system, comprising: a plurality of computers; and a first storage device coupled to the plurality of computers via a first network, wherein the plurality of computers include a first computer, a second computer, and a third computer, wherein the first computer has a first interface coupled to the first network, a first processor coupled to the first interface, and a first memory coupled to the first processor, wherein the second computer has a second interface coupled to the first network, a second processor coupled to the second interface, and a second memory coupled to the second processor, wherein the third computer has a third interface coupled to the first network, a third processor coupled to the third interface, and a third memory coupled to the third processor, wherein the first storage device has a plurality of storage areas for storing data written by the plurality of computers and a first controller for controlling data write and data read in the plurality of storage areas, wherein the plurality of storage areas include a first storage area, wherein the first computer accesses data within the first storage area via the first network, wherein the computer system holds load information containing values of load on the plurality of computers and settings information indicating a mode set to the computer system, wherein the first computer is configured to: cut, in the case where the settings information indicates a first mode and the load on the first computer is lower than both the load on the second computer and the load on the third computer, at least a part of electric power supplied to the first processor, the first memory, and the first interface; cut, in the case where the settings information indicates a second mode and the load on the first computer is lower than at least one of the load on the second computer and the load on the third computer, the at least a part of electric power supplied to the first processor, the first memory, and the first interface; and send, before cutting the at least a part of electric power supplied to the first processor, the first memory, and the first interface, a takeover request to the second computer, and wherein, after receiving the takeover request, the second computer accesses the data within the first storage area via the first network.

According to an embodiment of this invention, running cost can be cut by reducing the power consumption of nodes constituting NAS. The reliability and power consumption reduction amount of a system can thus be adjusted as desired. In certain cases, an arbitrary node can be chosen to be reduced in power consumption.

BRIEF DESCRIPTION OF THE DRAWINGS

FIG. 4 is an explanatory diagram of power saving levels set to the nodes according to the first embodiment of this invention.

FIG. 5 is an explanatory diagram of transitions between power saving levels according to the first embodiment of this invention.

FIG. 12 is an explanatory diagram of a collected information table which is kept in each node according to the first embodiment of this invention.

FIG. 13 is an explanatory diagram of an administrator setting table which is kept in each node according to the first embodiment of this invention.

FIG. 14 is an explanatory diagram of a shutdown schedule table held by each node according to the first embodiment of this invention.

FIG. 15 is an explanatory diagram of a power saving level policy table which is kept in each node according to the first embodiment of this invention.

FIG. 16 is an explanatory diagram of a NAS management table which is kept in each node according to the first embodiment of this invention.

FIG. 17 is an explanatory diagram of a file access information table which is kept in each node according to the first embodiment of this invention.

FIG. 23 is an explanatory diagram of a priority mode policy table which is kept in each node according to the first embodiment of this invention.

FIG. 24 is an explanatory diagram of a priority mode schedule table which is kept in each node according to the first embodiment of this invention.

DETAILED DESCRIPTION OF THE PREFERRED EMBODIMENTS

Embodiments of this invention will be described below with reference to the accompanying drawings.

A first embodiment of this invention will be described first.

Figure 1:
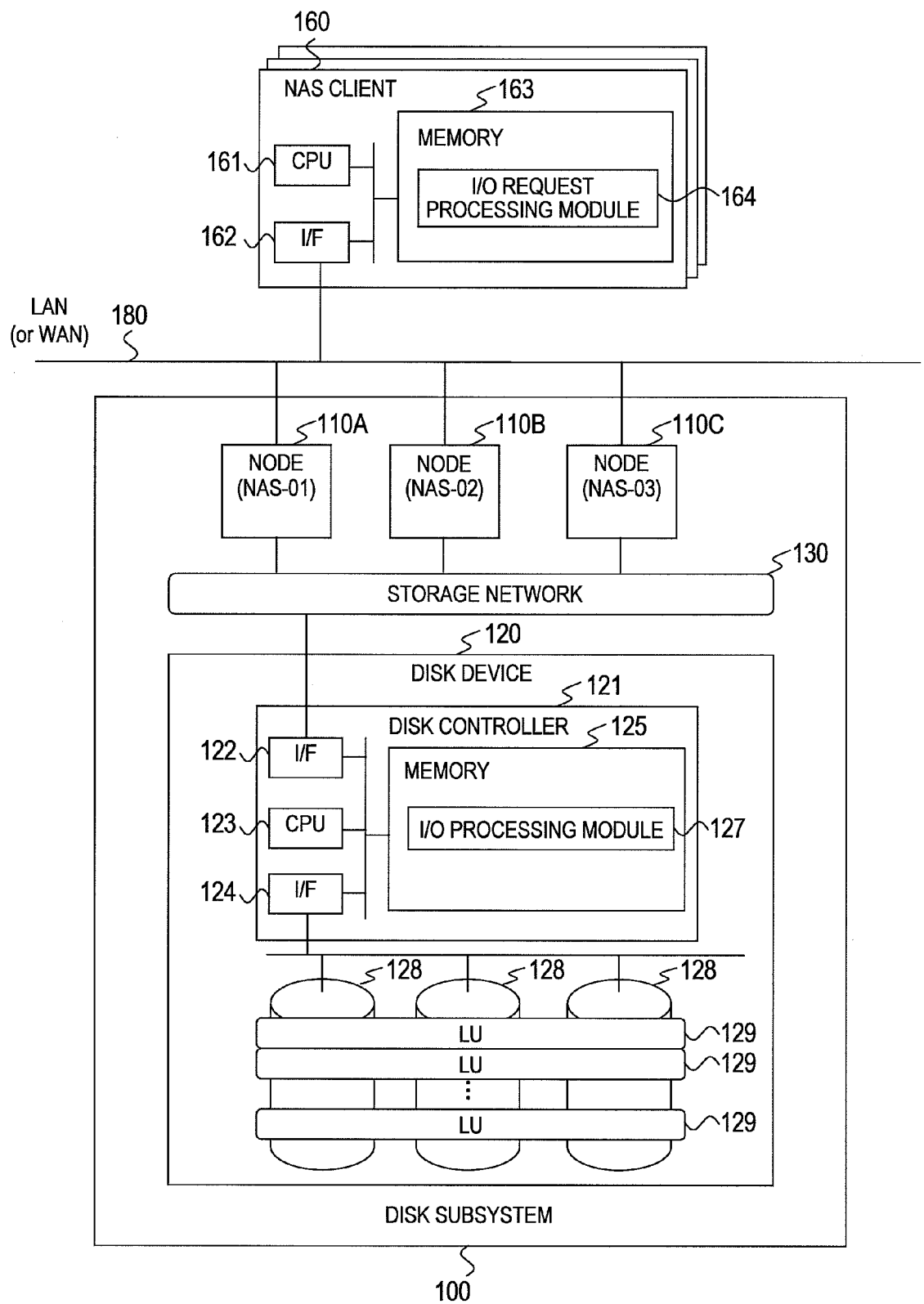
FIG. 1 is a block diagram showing a hardware configuration of a computer system according to a first embodiment of this invention.

FIG. 1 is a block diagram showing a hardware configuration of a computer system according to the first embodiment of this invention.

The computer system of this embodiment has one or more network attached storage (NAS) clients 160 and a disk subsystem 100 which is connected to the NAS client(s) 160 via a local area network (LAN) 180.

The disk subsystem 100 is NAS having nodes 110A to 110C and a disk device 120. The nodes 110A to 110C and the disk device 120 are connected to each other via a storage network 130.

There is no need for the whole disk subsystem 100 to be housed in a single casing. For instance, the disk subsystem 100 may be structured such that the nodes 110A to 110C and the disk device 120 have their respective casings which are independent of each other and interconnected via the storage network 130.

The nodes 110A to 110C are computers for connecting the disk device 120 to the LAN 180 (NAS servers or NAS nodes). The configuration of the nodes 110A to 110C will be described later in detail with reference to FIG. 2. "NAS-01" to "NAS-03" affixed to the nodes 110A to 110C in FIG. 1 are the identifiers of the nodes 110A to 110C, respectively.

The disk device 120 is a device that stores data written by the nodes 110A to 110C upon reception of write requests from the NAS client(s) 160. The disk device 120 of this embodiment has a disk controller 121 and one or more disk drives 128.

Each disk drive 128 is a storage device which provides a data storage area. The disk drive 128 may be, for example, a hard disk drive (HDD) or other types of storage devices (e.g., semiconductor storage device such as a flash memory). The disk device 120 may have multiple disk drives 128, which may constitute redundant arrays of inexpensive disks (RAID). Data written by any NAS client 160 is ultimately stored in a physical storage area provided by the disk drive 128.

A logical volume (Logical Unit: LU) 129 is an area treated as a logical disk drive by the nodes 110A to 110C. The logical storage area of the LU 129 is associated with the physical storage area of the disk drive 128. The logical storage area of one LU 129 may be associated with the physical storage area of one disk drive 128, or may be associated with the physical storage areas of multiple disk drives 128.

The disk controller 121 is a control device that controls the disk device 120. The disk controller 121 of this embodiment has an interface (I/F) 122, a CPU 123, an I/F 124, and a memory 125, which are connected to one another.

The I/F 122 is an interface that connects the disk controller 121 to the storage network 130. Through the I/F 122, the disk controller 121 communicates with the nodes 110A to 110C connected to the storage network 130.

The CPU 123 is a processor that executes a program stored in the memory 125.

The I/F 124 is an interface that connects the disk controller 121 to the disk drive 128. The disk controller 121 writes and reads data in and out of the disk drive 128 through the I/F 124.

The memory 125 is, for example, a semiconductor memory, and stores a program executed by the CPU 123 and data referred to by the CPU 123. The memory 125 of this embodiment stores at least an I/O processing module 127.

The I/O processing module 127 is a program module that controls data write and data read in the disk drive 128.

The disk controller 121 may be further equipped with a cache memory (not shown) in which data to be written in the disk drive 128 and data read out of the disk drive 128 are temporarily stored.

The disk device 120, which, in the example of FIG. 1, has multiple disk drives 128, may have only one disk drive 128. Alternatively, the disk device 120 may be a single disk drive 128 that has an interface connectable to the storage network 130.

The storage network 130 is a network that mediates communication between the nodes 110A to 110C and the disk device 120. Any type of network can be employed as the storage network 130. For example, the storage network 130 can be a PCI bus or a fibre channel (FC) network.

In the following description, the nodes 110A to 110C are collectively referred to as nodes 110 when there is no particular need to discriminate the nodes 110A to 110C from one another.

While the computer system shown in FIG. 1 has three nodes 110 and one disk device 120, this embodiment can be implemented by a computer system that has any number of nodes 110 larger than three and any number of disk devices 120 larger than one.

Each NAS client 160 is a computer in which various application programs are run. The NAS client 160 of this embodiment has a CPU 161, an I/F 162, and a memory 163.

The CPU 161 is a processor that executes a program stored in the memory 163.

The I/F 162 is an interface that connects the NAS client 160 to the LAN 180. Through the I/F 162, the NAS client 160 communicates with a device connected to the LAN 180 (e.g., the node 110).

The memory 163 is, for example, a semiconductor memory, and stores a program executed by the CPU 161 and data referred to by the CPU 161. The memory 163 of this embodiment stores at least an I/O request processing module 164.

The I/O request processing module 164 is provided as a part of an operating system (OS) (not shown) run in the NAS client 160. Any OS (e.g., the Windows® or the Solaris®) can be run in the NAS client 160.

The memory 163 further stores various application programs (not shown) executed in the OS. Write requests and read requests issued by the application programs are processed by the I/O request processing module 164.

The computer system of this embodiment can have an arbitrary number of NAS clients 160. The LAN 180 may be replaced by a wide area network (WAN), or a network in which a LAN and a WAN coexist.

Figure 2:
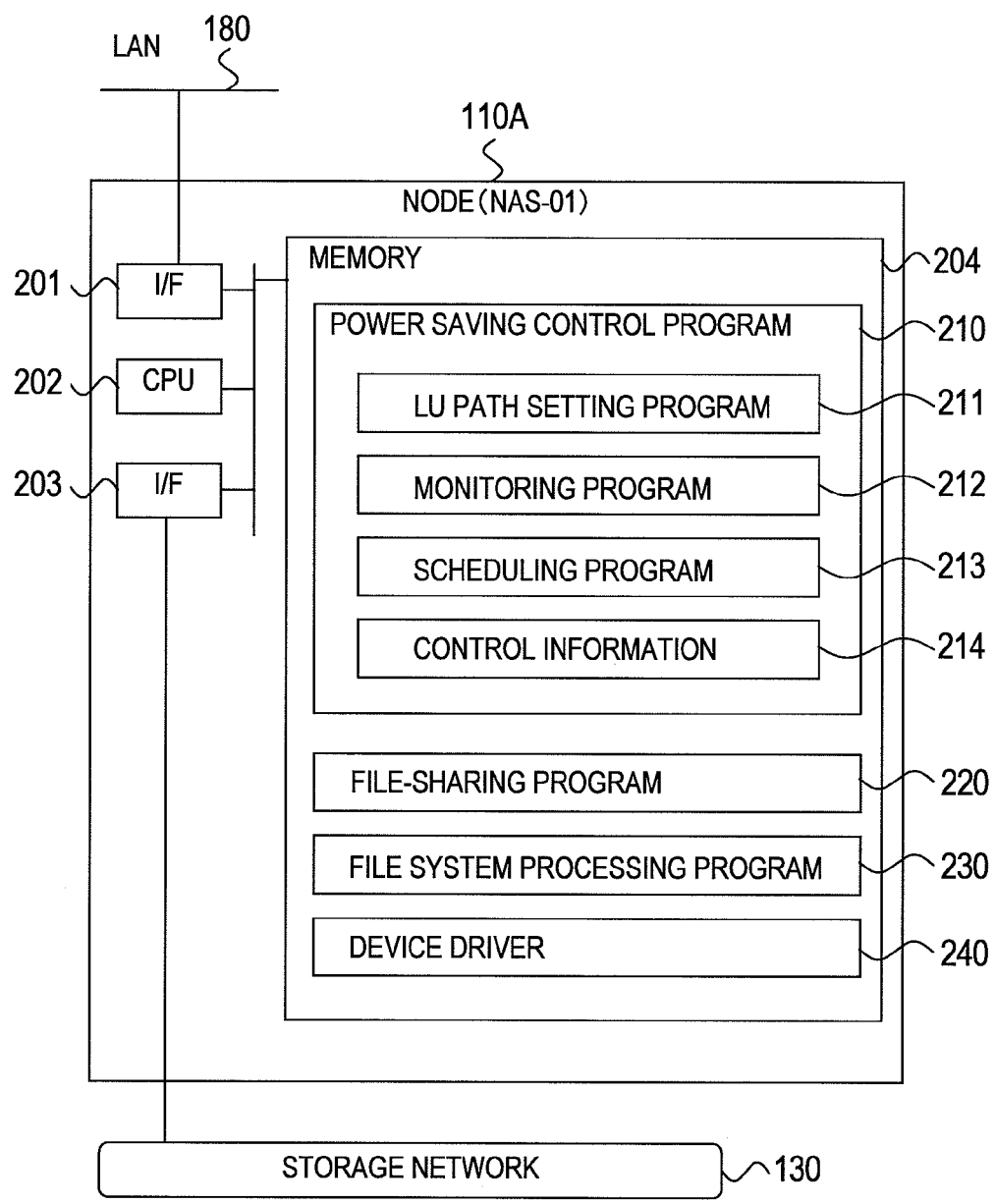
FIG. 2 is a block diagram showing a hardware configuration of a node according to the first embodiment of this invention.

FIG. 2 is a block diagram showing the hardware configuration of the node 110 according to the first embodiment of this invention.

FIG. 2 shows as an example the hardware configuration of the node 110A. The nodes 110B and 110C have the same hardware configuration as that of the node 110A, and illustration and description of the hardware configuration of the nodes 110B and 110C will be omitted.

The node 110 has an I/F 201, a CPU 202, an I/F 203, and a memory 204, which are connected to one another.

The I/F 201 is an interface that connects the node 110 to the LAN 180. Through the I/F 201, the node 110 communicates with a device connected to the LAN 180 (for example, the NAS client 160). The I/F 201 is, for example, a network interface card (NIC).

The CPU 202 is a processor that executes a program stored in the memory 204. Therefore, processing executed in the following description by a program stored in the memory 204 (e.g., a power saving control program 210 described later) is actually executed by the CPU 202.

The I/F 203 is an interface that connects the node 110 to the storage network 130. The node 110 communicates with the disk device 120 through the I/F 203. The I/F 203 is, for example, a host bus adapter (HBA).

The memory 204 is, for example, a semiconductor memory, and stores a program executed by the CPU 202 and data referred to by the CPU 202. The memory 204 of this embodiment stores, as a program module executed by the CPU 202, at least the power saving control program 210, a file-sharing program 220, a file system processing program 230, and a device driver 240. The file system processing program 230 and the device driver 240 are provided as a part of an OS (not shown) run in the node 110.

The power saving control program 210 is a program module executed by the CPU 202 in order to manage the power consumption of the disk subsystem 100, more specifically, in order to reduce the power consumption of the disk subsystem 100. The power saving control program 210 contains three program modules: an LU path setting program 211, a monitoring program 212, and a scheduling program 213. The power saving control program 210 further manages control information 214, which contains various types of information referred to by the program modules of the power saving control program 210. The control information 214 is stored as, for example, table-format data in the memory 204 as will be described later.

Processing executed by the program modules of the power saving control program 210 and the control information 214 will be described later in detail.

The file-sharing program 220 provides a file-sharing protocol to the NAS clients 160 connected to the LAN 180, thereby providing a function of sharing a file among the NAS clients 160. The file-sharing protocol may be, for example, a network file system (NFS) or a common internet file system (CIFS). The file-sharing program 220 executes, when receiving a file-basis I/O (=read or write) request from one of the NAS clients 160, the requested file-basis I/O in a file system, which will be described later.

The file system processing program 230 provides hierarchized logical views (directories, files, and the like) to an upper layer, and converts the logical views into a physical data configuration (block data, block address) to execute I/O processing in a lower layer.

The device driver 240 executes block I/O requested by the file system processing program 230.

The first embodiment of this invention is now outlined with reference to FIGS. 3 to 10.

Figure 3:
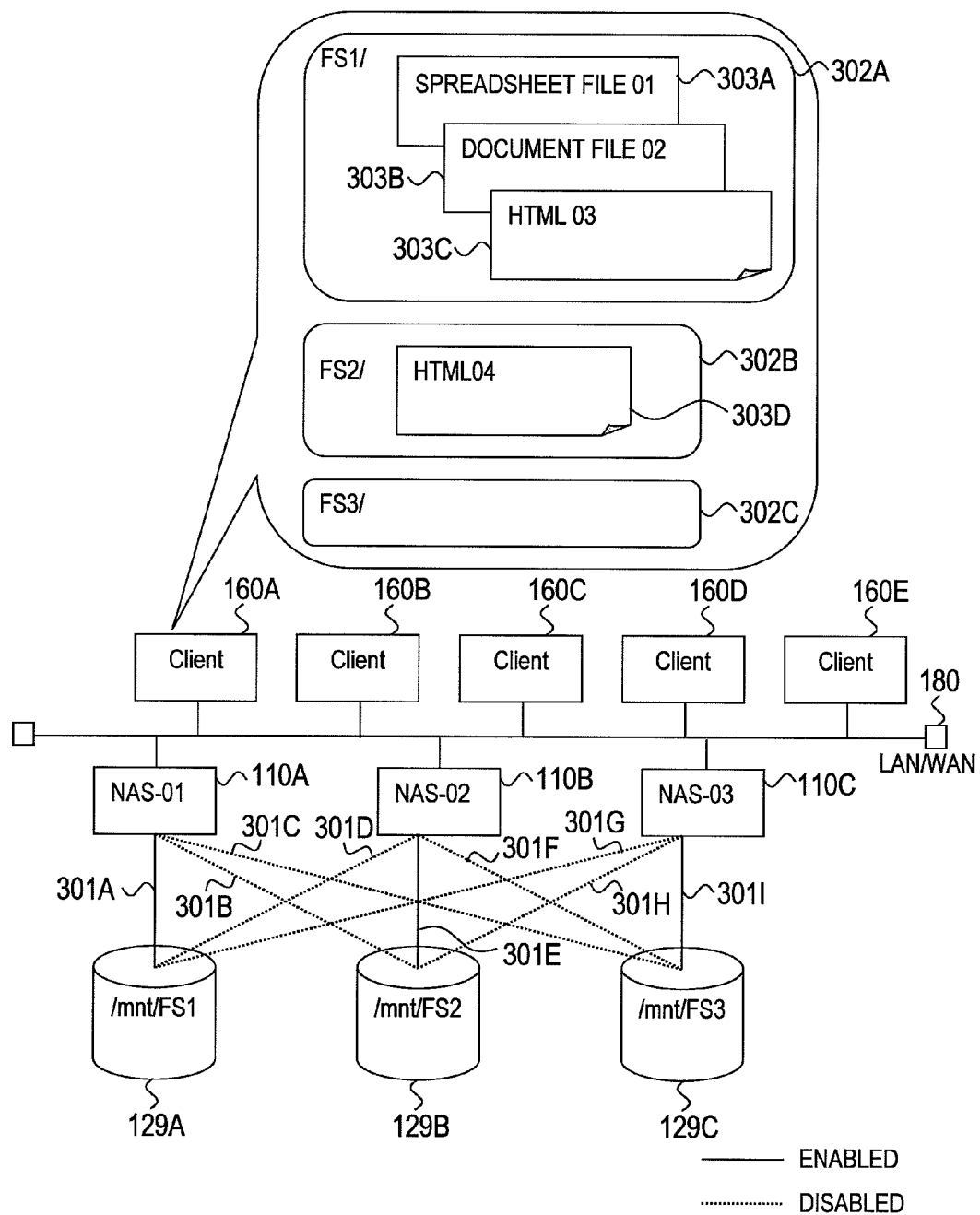
FIG. 3 is an explanatory diagram showing the configuration of the computer system in which processing is executed according to the first embodiment of this invention.

FIG. 3 is an explanatory diagram showing the configuration of the computer system in which processing is executed according to the first embodiment of this invention.

FIG. 3 reflects the computer system shown in FIG. 1 but omits details (for example, the disk controller 121) that are not necessary in describing the outline of the first embodiment.

The nodes 110A to 110C and five NAS clients 160A to 160E are connected to each other via the LAN 180. The NAS clients 160A to 160E each correspond to one of the multiple NAS clients 160 shown in FIG. 1.

Various application programs are run in each NAS client 160. Each application program uses one or more file systems 302 via the nodes 110. For instance, an application program run in the NAS client 160A uses file systems 302A to 302C.

The file systems 302A to 302C each constitute one of multiple file systems 302. Each file system 302 contains one or more files 303. For example, the file system 302A contains files 303A, 303B, and 303C, and the file system 302B contains a file 303D. The files 303A, 303B, 303C, and 303D each constitute one of the multiple files 303.

LUs 129A to 129C each correspond to one of the multiple LUs 129 shown in FIG. 1.

The LUs 129A to 129C in the example of FIG. 3 each contain one file system 302. Specifically, in the example of FIG. 3, the LU 129A contains the file system 302A, the LU 129B contains the file system 302B, and the LU 129C contains the file system 302C. The file system 302A, the file system 302B, and the file system 302C are identified by identifiers "FS1", "FS2", and "FS3", respectively, and mounted at "/mnt/FS1", "/mnt/FS2", and "/mnt/FS3", respectively.

Multiple communication paths 301 are set between the multiple nodes 110 and the multiple LUs 129. Specifically, a path 301A is set between the node 110A and the LU 129A, a path 301B is set between the node 110A and the LU 129B, and a path 301C is set between the node 110A and the LU 129C. A path 301D is set between the node 110B and the LU 129A, a path 301E is set between the node 110B and the LU 129B, and a path 301F is set between the node 110B and the LU 129C. A path 301G is set between the node 110C and the LU 129A, a path 301H is set between the node 110C and the LU 129B, and a path 301I is set between the node 110C and the LU 129C. The paths 301A to 301I each constitute one of the multiple paths 301.

In this embodiment, physical communication paths corresponding to the paths 301 are set to all of the paths 301A to 301I. The LU path setting program 211 can logically make a switch between the availability and unavailability of communication via the paths 301A to 301I by changing the settings of the paths 301A to 301I. The switching may be executed by any method. For example, the switching may be executed by mounting or unmounting the file systems 302 to or from the nodes 110, or by enabling or disabling the paths 301.

In the example of FIG. 3, the paths 301A, 301E, and 301I are set open for communication, and the NAS clients 160 write and read data in the files 303 within the file system 302A by accessing the node 110A. Similarly, the NAS clients 160 access the node 110B to use the file system 302B and access the node 110C to use the file system 302C. The path 301B is set closed for communication in the example of FIG. 3. The NAS clients 160 therefore cannot use the file system 302B by accessing the node 110A.

FIG. 4 is an explanatory diagram of power saving levels set to the nodes 110 according to the first embodiment of this invention.

Each node 110 can reduce its own power consumption by limiting electric power supplied to its components. Power saving levels shown in FIG. 4 mean levels of power cut. Multiple power saving levels can be set to each node 110. Four levels ranging from the power saving level 0 to the power saving level 3 can be set to each node 110 of this embodiment.

The power saving level 0 means an operational mode. The node 110 that is set to the power saving level 0 provides a file-sharing service to the NAS clients 160. In other words, components of the node 110 that is set to the power saving level 0 receive a normal supply of electric power and are in operation.

The node 110 that is set to any of the power saving levels 1 to 3 limits electric power supplied to at least some of its components. Therefore, the power consumption of the node 110 that is set to any of the power saving level 1, 2, or 3 is smaller than that of the node 110 that is set to the power saving level 0. In the following description, a state of the node 110 in which the node 110 is set to any of the power saving levels 1 to 3 is also referred to as a power saving mode. The node 110 that is in a power saving mode stops providing a file-sharing service to the NAS clients 160 since at least some of its components are not in operation.

The node 110 that is set to the power saving level 1 limits electric power supplied to its CPU 202. This node 110 can return to the power saving level 0 in a relatively short time since its other components than the CPU 202 receive a normal supply of electric power. Therefore, the node 110 that should be set to the power saving level 1 is, for example, one that is to take over the service from the currently running node 110 when a failure occurs in the currently running node 110.

The power saving level 2 equals so-called memory suspend. The node 110 that is set to the power saving level 2 stores information indicating its state prior to the shift to the power saving mode in the memory 204, and limits electric power supplied to other components than the memory 204. The memory 204 receives a supply of electric power at least enough to keep the information.

The power saving level 3 equals so-called soft off. The node 110 that is set to the power saving level 3 shuts down its OS. The hardware of this node 110 receives only a small supply of electric power enough to recover to the power saving level 0.

Thus, as the level number of the power saving level rises, a wider range of components of the node 110 receive a limited supply of electric power. Setting a higher power saving level to the node 110 therefore makes the power consumption of the node 110 smaller while prolonging the resumption period of the node 110 (the time necessary for the node 110 to return to a state where the node 110 can provide the service in a normal manner).

The power saving level of each node 110 can be switched by a known technology. For example, advanced configuration and power interface (ACPI) may be employed to switch the power saving level. In the case where ACPI is employed, the power saving level 1 described above corresponds to S1 Sleeping State of ACPI, the power saving level 2 corresponds to S3 Sleeping State, and the power saving level 3 corresponds to Soft Off State.

This invention is also applicable to cases where the power saving level is switched by other technologies than ACPI.

In this embodiment, the four power saving levels are set by switching the ranges of components to which electric power is supplied as shown in FIG. 4. However, any number of power saving levels equal to or larger than two can be set in a similar manner by setting arbitrary ranges of components to which electric power is supplied. In either case, the resumption period of the node 110 is prolonged as less power is consumed by limiting supply of electric power.

FIG. 5 is an explanatory diagram of transitions between power saving levels according to the first embodiment of this invention.

The node 110 that is at the power saving level 0 can shift to any of the power saving levels 1, 2, and 3, whereas the node 110 that is at the power saving level 1, 2, or 3 can shift only to the power saving level 0.

Figure 6:
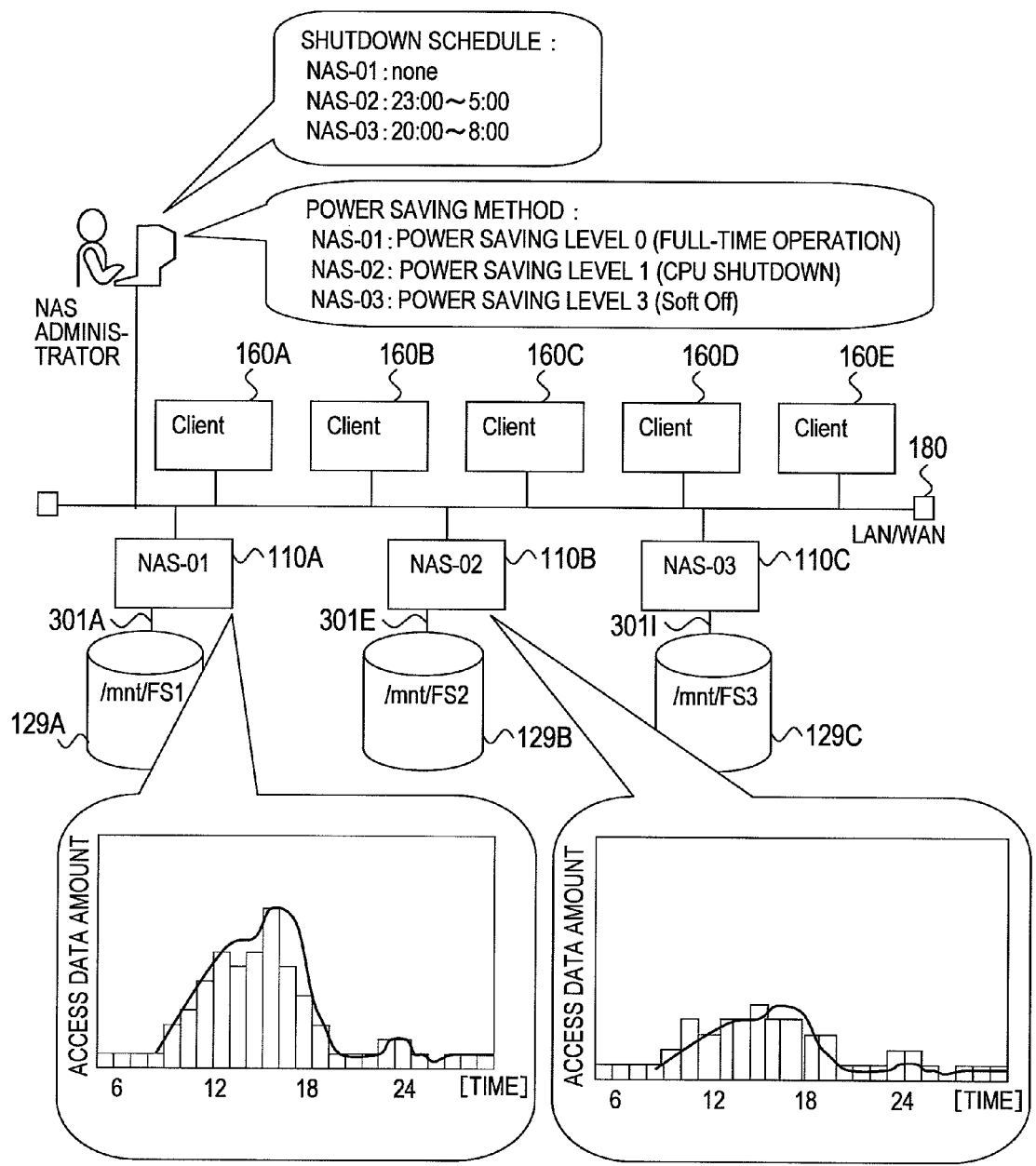
FIG. 6 is an explanatory diagram of how a shutdown schedule and a power saving method are set according to the first embodiment of this invention.

FIG. 6 is an explanatory diagram of how a shutdown schedule and a power saving method are set according to the first embodiment of this invention.

A NAS administrator can set a shutdown schedule and a power saving method for each node 110. A shutdown schedule is a schedule for setting the individual node 110 to a power saving mode. A power saving method means a specific power saving level set as a power saving mode.

The NAS administrator can set a shutdown schedule and a power saving method based on the past operation of each node 110. The past operation of one node 110 is the statistics of performance information measured in the node 110 for a given period of time. In the example of FIG. 6, the access data amount of each node 110 is measured for each time slot.

For instance, a shutdown schedule may be set such that one node 110 enters a power saving mode in a time slot where the measured access data amount of this node 110 is smaller than a given threshold. Alternatively, a shutdown schedule may be set such that an appropriate number of nodes 110 are in operation according to the sum of the access data amounts of all the nodes 110 (in other words, more nodes 110 are put into operation as the total access data amount rises).

Similarly, the power saving level of one node 110 may be set such that the power consumption of this node 110 decreases as the access data amount measured in this node 110 becomes smaller.

However, the set shutdown schedule desirably keeps at least one node 110 in operation all the time. A complete cessation of the providing of the service is thus avoided. When only one node 110 is in operation, it is desirable to set at least one of the nodes 110 that are in power saving modes to the power saving level 1. This way, when a failure occurs in the operating node 110, the node 110 that is at the power saving level 1 can recover quickly to take over the service from the failed node 110.

It is also possible to determine how many nodes 110 should be put into operation based on a given policy as will be described later with reference to FIG. 22. For instance, when the system reliability is given priority, the NAS administrator may decide on such a shutdown schedule that keeps two or more nodes 110 in operation all the time. When cutting power consumption is given priority, on the other hand, a shutdown schedule may be set such that only one node 110 is in operation in a given time slot.

Setting of a shutdown schedule and a power saving method in the manner described above may be executed manually by the NAS administrator, or automatically by each node 110.

The example shown in FIG. 6 is of a case where the number of operating NAS clients 160 is smaller at night than during the day. In this example, the node 100A (i.e., NAS-01) is set to be in operation all the time. The node 110B (i.e., NAS-02) is set to operate at the power saving level 1 every day from 23:00 to 5:00. The node 110C (i.e., NAS-03) is set to operate at the power saving level 3 every day from 20:00 to 8:00.

Each node 110 holds the shutdown schedule and power saving method shown in FIG. 6 as a shutdown schedule table 1400 as will be described later with reference to FIG. 14.

Figure 7:
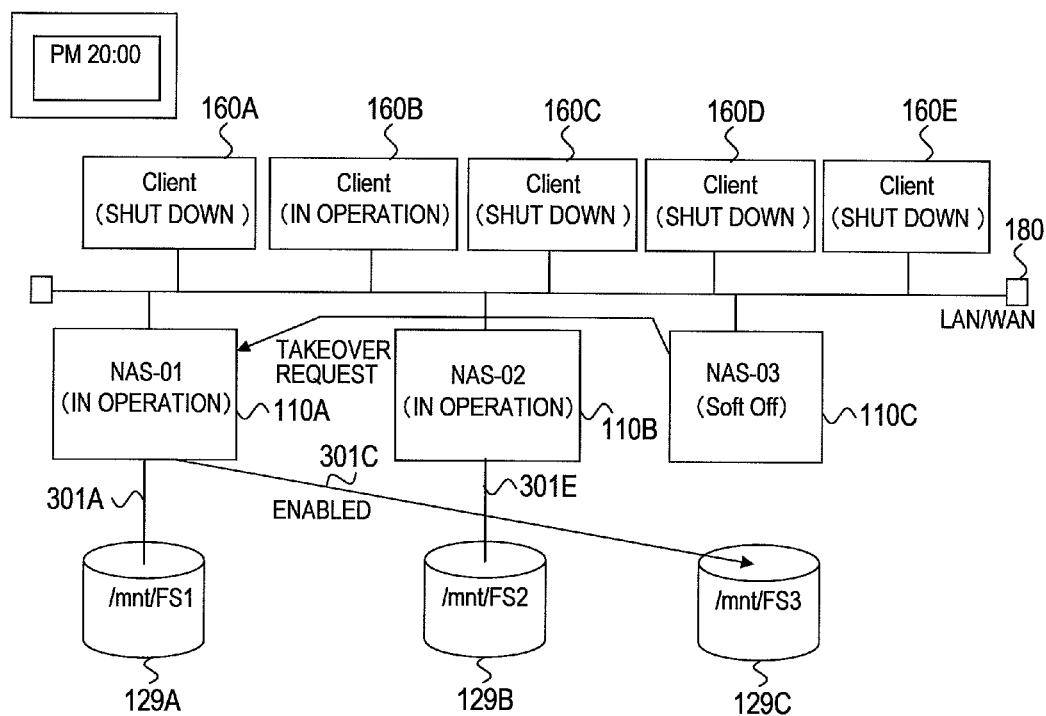
FIG. 7 is an explanatory diagram of processing that is executed to shift one node to a power saving mode according to the first embodiment of this invention.

FIG. 7 is an explanatory diagram of processing that is executed to shift one node 110 to a power saving mode according to the first embodiment of this invention.

In the example of FIG. 6, the node 110C shifts to the power saving level 3 at 20:00, and FIG. 7 shows processing executed at that point.

As the current time reaches 20:00, the monitoring program 212 of the node 110C judges that the time to shift to a power saving mode has arrived for its own node 110C. Then the monitoring program 212 of the node 110C sends a takeover request to one of other operating nodes 110 (one of other nodes 110 than the one in which the monitoring program 212 in question is being run; the node 110A in the example of FIG. 7). The node 110C has been executing a service of providing the file system 302C within the LU 129C to the NAS clients 160. The takeover request is for requesting the node 110A to take over the service. The takeover request accordingly contains a path switching request for enabling the path 301C. The LU path setting program 211 of the node 11C disables the path 301I.

After sending the takeover request, the node 110C shifts to the power saving level 3.

The LU path setting program 211 of the node 110A receives the takeover request and enables the path 301C. The NAS clients 160 can subsequently use the file system 302C within the LU 129C by accessing the node 110A.

The current time may be obtained from a clock (not shown) which is provided in each node 110, or from a computer (not shown) (e.g., time server) which is connected via the LAN 180.

Figure 8:
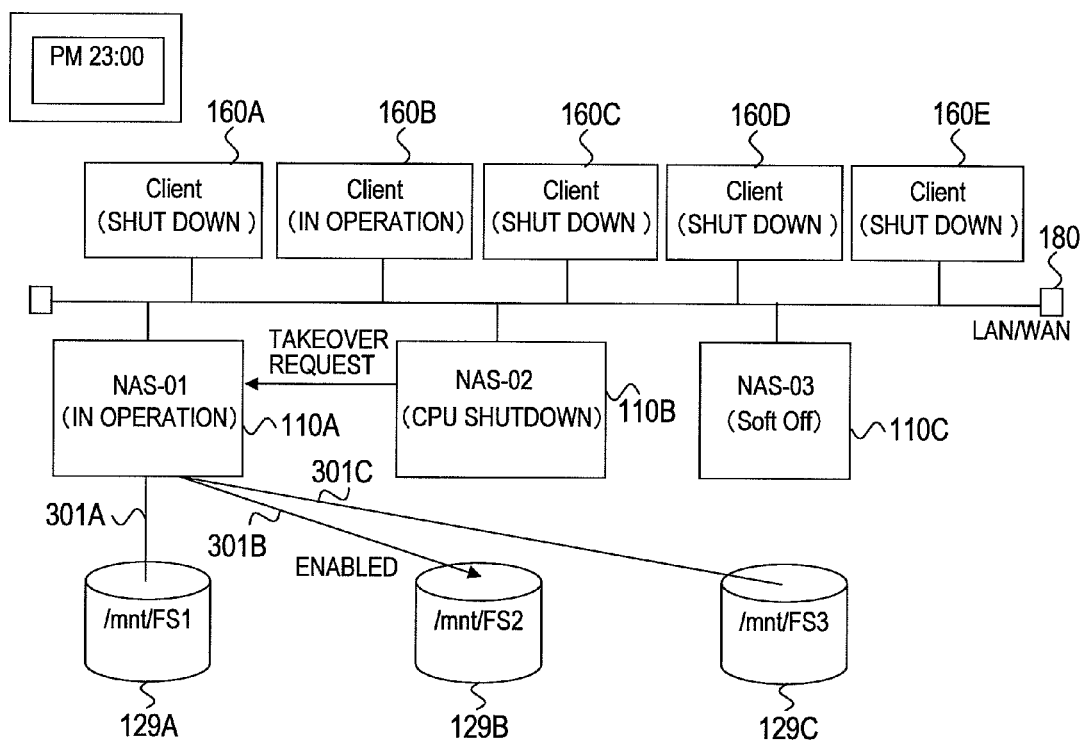
FIG. 8 is an explanatory diagram of processing that is executed to shift another node to a power saving mode according to the first embodiment of this invention.

FIG. 8 is an explanatory diagram of processing that is executed to shift another node 110 to a power saving mode according to the first embodiment of this invention.

In the example of FIG. 6, the node 110B shifts to the power saving level 1 at 23:00, and FIG. 8 shows processing executed at that point.

As the current time reaches 23:00, the monitoring program 212 of the node 110B judges that the time to shift to a power saving mode has arrived for its own node 110B. Then the monitoring program 212 of the node 110B sends a takeover request to the other operating node 110 (the node 110A in the example of FIG. 8). The node 110B has been executing a service of providing the file system 302B within the LU 129B to the NAS clients 160. The takeover request is for requesting the node 110A to take over the service. The takeover request accordingly contains a path switching request for enabling the path 301B. Further, the LU path setting program 211 of the node 110B disables the path 301E.

After sending the takeover request, the node 110B shifts to the power saving level 1.

The LU path setting program 211 of the node 110A receives the takeover request and enables the path 301B. The NAS clients 160 can subsequently use the file system 302B within the LU 129B by accessing the node 110A.

As shown in FIGS. 7 and 8, shifting one or more nodes 110 to power saving modes in time slots where the load on the nodes 110 is light (low) (e.g., at night when fewer NAS clients 160 are in operation) reduces the overall power consumption of the system.

Figure 9:
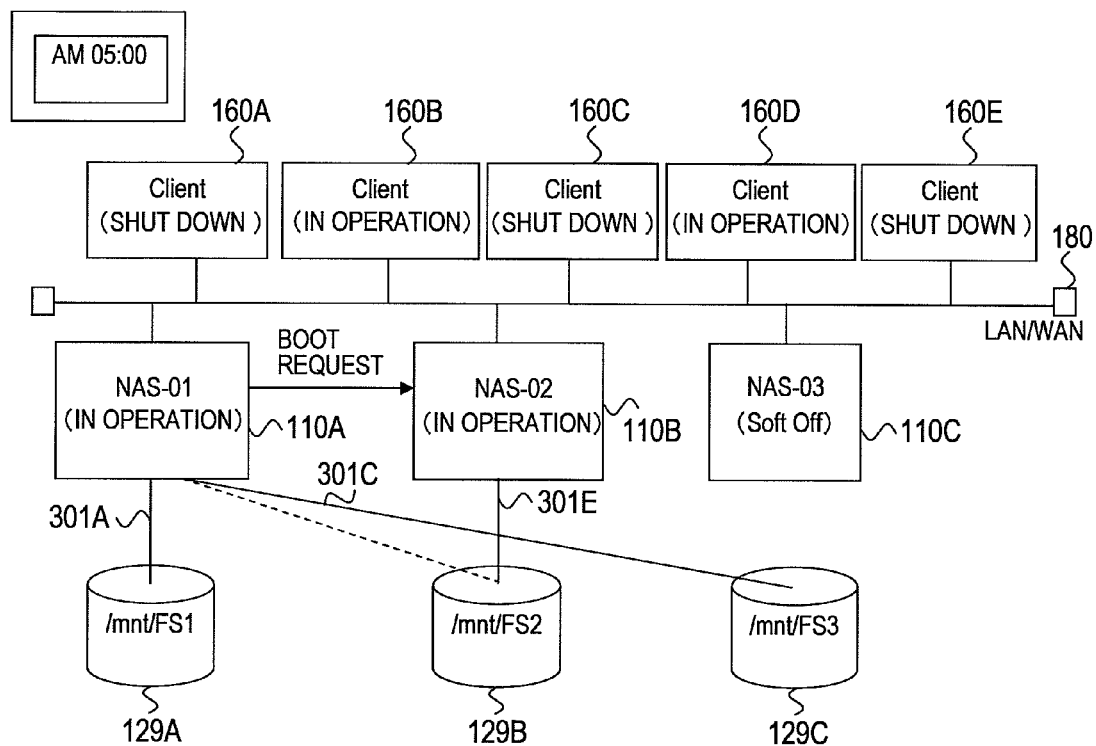
FIG. 9 is an explanatory diagram of processing that is executed for one node to recover from a power saving mode according to the first embodiment of this invention.

FIG. 9 is an explanatory diagram of processing that is executed for one node 110 to recover from a power saving mode according to the first embodiment of this invention.

In the example of FIG. 6, the node 110B recovers from the power saving level 1 to the power saving level 0 at 5:00 (in other words, in operation mode), and FIG. 9 shows processing executed at that point.

As the current time reaches 5:00, the monitoring program 212 of the node 110A judges that the time to recover from a power saving mode has arrived for the node 110B. Then the monitoring program 212 of the node 110A sends a boot request to the node 110B. The node 110A has taken over from the node 110B a service of providing the file system 302B within the LU 129B to the NAS clients 160. The boot request is accordingly for instructing the node 110B to take back the service. The LU path setting program 211 of the node 110A disables the path 301B.

Receiving the boot request, the node 110B shifts from the power saving level 1 to the power saving level 0. Further, the LU path setting program 211 of the node 110B enables the path 301E. The NAS clients 160 can subsequently use the file system 302B within the LU 129B by accessing the node 110B.

Figure 10:
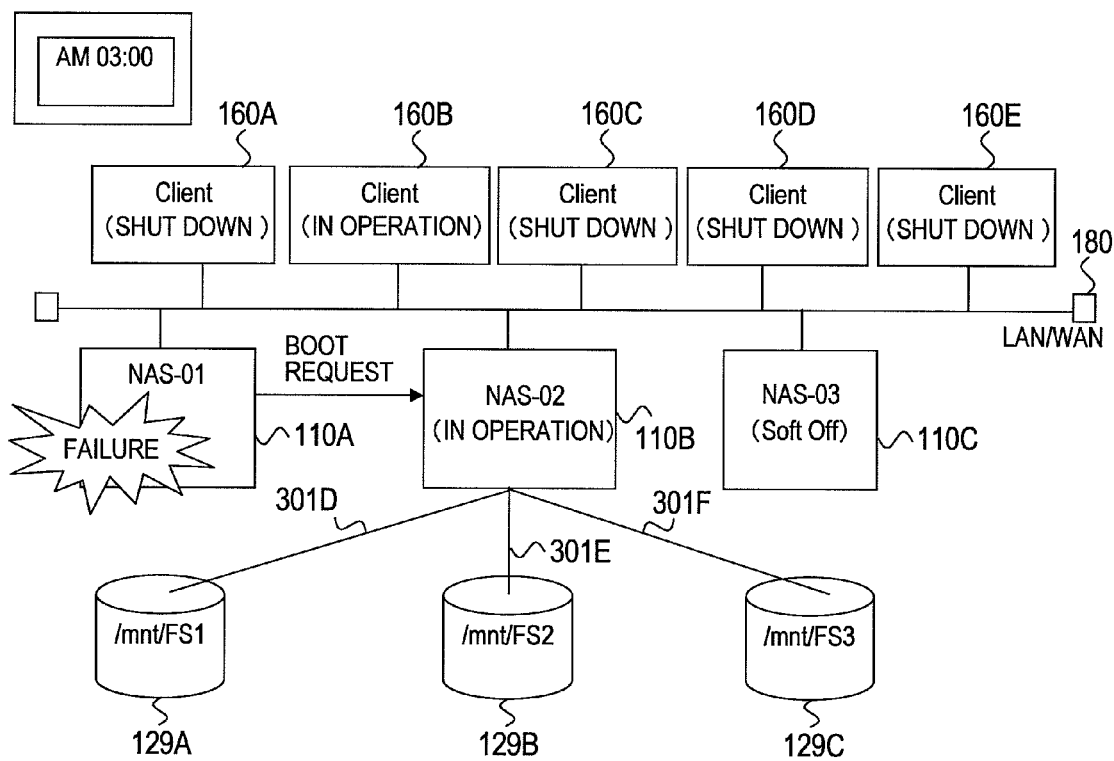
FIG. 10 is an explanatory diagram of processing that is executed when a failure occurs in an operating node according to the first embodiment of this invention.

FIG. 10 is an explanatory diagram of processing that is executed when a failure occurs in the operating node 110 according to the first embodiment of this invention.

In the example of FIG. 6, the node 110A alone is in operation from 23:00 to 5:00. When a failure occurs in the node 110A in this time slot, all services of the entire system stop. FIG. 10 shows processing executed to avoid a complete cessation of the providing of services by the system when a failure occurs in the node 110A at some point (3:00, for example) during this time slot.

The failure that occurs as shown in FIG. 10 is a failure in the OS layer and above. In other words, the premise of the processing of FIG. 10 is that the OS can detect a failure and notify other nodes 110 of the detected failure.

When a failure makes the operating node 110A unable to provide a service to the NAS clients 160, the node 110A sends a boot request to one of the nodes 110 that are not in operation (for example, the node 110B). The node 110A has been executing a service of providing the file systems 302A to 302C to the NAS clients 160 up until the failure. The boot request is accordingly for instructing the node 110B to take over the service.

The LU path setting program 211 of the node 110A disables the paths 301A to 301C.

Receiving the boot request, the node 110B shifts from the power saving level 1 to the power saving level 0. The LU path setting program 211 of the node 110B enables the paths 301D to 301F. The NAS clients 160 can subsequently use the file systems 302A to 302C within the LUs 129A to 129C by accessing the node 110B.

Figure 11:
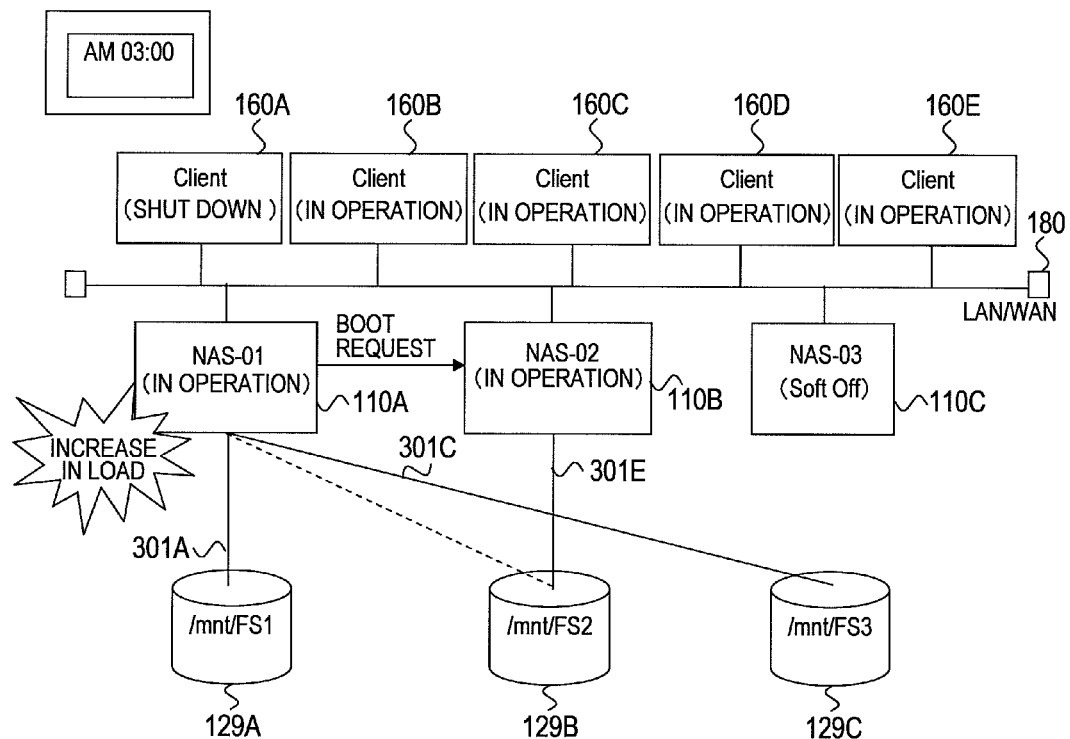
FIG. 11 is an explanatory diagram of processing that is executed when a load on the operating node increases according to the first embodiment of this invention.

FIG. 11 is an explanatory diagram of processing that is executed when the load on the operating node 110 increases according to the first embodiment of this invention.

In the example of FIG. 6, the node 110A alone is in operation from 23:00 to 5:00. Such a shutdown schedule is set based on the past operation of the system in which the load of access to the file systems 302A to 302C is light between 23:00 and 5:00, for example.

However, in practice, the load of access to the file systems 302A to 302C could increase in this time slot contrary to the past operation. While the example of FIGS. 7 to 10 is of a case where putting the node 110A alone into operation is enough since only the NAS client 160B is operating at night, there can be cases where the NAS clients 160 that are usually not operating around this hour (for example, the NAS clients 160C to 160E of FIG. 11) are in operation for some reason. In such cases, the load on the solely operating node 110A increases and the node 110A has to execute a lot of processing, with the result that the processing performance of the node 110A is degraded. FIG. 11 shows processing that is executed to avoid a drop in performance in such cases.

When the load on the operating node 110A exceeds a given threshold, the node 110A sends a boot request to one of the nodes 110 that are not in operation (for example, the node 110B). The node 110A has been executing a service of providing the file systems 302A to 302C to the NAS clients 160 up until the load exceeds the threshold. The boot request is accordingly for instructing the node 110B to partially take over the service. Shown in FIG. 11 is a case where the node 110B is instructed to take over a service of providing the file system 302B to the NAS clients 160.

The LU path setting program 211 of the node 110A disables the path 301B.

Receiving the boot request, the node 110B shifts from the power saving level 1 to the power saving level 0 irrespective of whether the time to boot up according to the original shutdown schedule has arrived or not. The LU path setting program 211 of the node 110B enables the path 301E. The NAS clients 160 can subsequently use the file systems 302A and 302C within the LUs 129A and 129C by accessing the node 110A, and the file system 302B within the LU 129B by accessing the node 110B. The access load is thus dispersed among multiple nodes 110 and the processing performance is improved.

FIG. 12 is an explanatory diagram of a collected information table 1200 which is kept in each node 110 according to the first embodiment of this invention.

The collected information table 1200 is stored in the memory 204 of each node 110 as a part of the control information 214.

The collected information table 1200 contains information indicating the load on the own node 110 and the load on other nodes 110. This load information is obtained by the scheduling program 213 of each node 110 from the own node 110 and other nodes 110 at given timings (e.g., regularly).

The collected information table 1200 contains a time field 1201, an information type field 1202, a NAS-01 field 1203, a NAS-02 field 1204, and a NAS-03 field 1205.

The time field 1201 is for registering a time at which the information is obtained. In the example of FIG. 12, "h1h1:m1m1:s1s1" indicates a certain "hour" by "h1h1", a certain "minute" by "m1m1", and a certain "second" by "s1s1". Similarly, "h2h2:m2m2:s2:s2" and "hxhx:mxmx:sx:sx" each indicate a different set of "hour:minute:second" than "h1h1:m1m1:s1s1".

The information type field 1202 is for registering the type of information obtained. In the example of FIG. 12, the CPU load and the I/O load are obtained as load information. The CPU load is measured by, for example, the utilization ratio (%) of the CPU 202 in each node 110. The I/O load is, for example, the I/O data count per unit time (megabytes/second) in each node 110.

The scheduling program 213 further obtains the file access count. The file access count is, for example, the count of files (one file, two files, three files . . . ) accessed per unit time by each node 110. The file access count may be obtained from file access information, which will be described later. The file access count can be used similarly to the CPU load and the I/O load, as a value that indicates the load on the node 110.

The NAS-01 field 1203 is for registering the value of the load on the node 110A obtained from the node 110A, which is identified by the identifier "NAS-01".

The NAS-02 field 1204 is for registering the value of the load on the node 110B obtained from the node 110B, which is identified by the identifier "NAS-02".

The NAS-03 field 1205 is for registering the value of the load on the node 110C obtained from the node 110C, which is identified by the identifier "NAS-03".

In the example of FIG. 12, "10%", "1 MB/s", and "100 files" are stored as the CPU load, the I/O load, and the file access count, respectively, in the NAS-01 field 1203 that is associated with the time field 1201 whose value is "h1h1:m1m1:s1s1". In the NAS-02 field 1204 that is associated with the same time field 1201, "1%", "0.1 MB/s", and "10 files" are stored as the CPU load, the I/O load, and the file access count, respectively. In the NAS-03 field 1205 that is associated with the same time field 1201, "0%", "0 MB/s", and "0 file" are stored as the CPU load, the I/O load, and the file access count, respectively. Those values indicate that, at the time "h1h1:m1m1:s1s1", the load on the node 110A is the heaviest of the three nodes 110 and the node 110C is not in operation.

FIG. 13 is an explanatory diagram of an administrator setting table 1300 which is kept in each node 110 according to the first embodiment of this invention.

The administrator setting table 1300 is stored in the memory 204 of each node 110 as a part of the control information 214.

The administrator setting table 1300 contains information indicating what power saving level are set to the individual node 110 and information indicating when the individual node 110 enters a power saving mode. The information is obtained from the NAS administrator by the scheduling program 213 of each node 110.

For instance, the NAS administrator can enter information to the administrator setting table 1300 by operating a management terminal (not shown) connected to the LAN 180 or any one of the nodes 110. The NAS administrator may operate the management terminal or the node 110 through an arbitrary graphical user interface (GUI) or command line interface (CLI). The management terminal or the node 110 that has received the input sends the entered information to each node 110. All the nodes 110 can thus keep the same administrator setting table 1300.

The administrator setting table 1300 of FIG. 13 contains a NAS field 1301, a power saving level field 1302, a power saving time field 1303, and a return time field 1304.

The NAS field 1301 is for registering the identifier of each node 110. In the example of FIG. 13, each NAS field 1301 holds one of the identifiers "NAS-01" to "NAS-03" of the nodes 110A to 110C.

The power saving level field 1302 is for registering a power saving level set to the individual node 110.

The power saving time field 1303 is for registering a time when the individual node 110 shifts from the operational mode to a power saving mode.

The return time field 1304 is for registering a time when the individual node 110 returns from a power saving mode to the operational mode.

A time period between a time written in the power saving time field 1303 and a time written in the return time field 1304 is the length of time in which the individual node 110 operates in a power saving mode.

In the example of FIG. 13, "0" is stored in the power saving level field 1302 in association with the node 110A (NAS-01). This means that the node 110A is in operation all the time. In other words, the node 110A never shifts to a power saving level. It is therefore unnecessary to store valid values in the power saving time field 1303 and return time field 1304 for the node 110A.

In the example of FIG. 13, "1", "23:00", and "05:00" are stored in the power saving level field 1302, the power saving time field 1303, and the return time field 1304, respectively, in association with the node 110B (NAS-02). This means that the node 110B is at the power saving level 1 from 23:00 to 05:00.

In the example of FIG. 13, "3", "auto", and "auto" are stored in the power saving level field 1302, the power saving time field 1303, and the return time field 1304, respectively, in association with the node 110C (NAS-03). This means that the NAS administrator has specified the power saving level 3 as a power saving level to be set to the node 110C but has not specified a time period in which the node 110C operates at the power saving level 3.

The time period in which the node 110C operates at the power saving level 3 in this case is calculated by the scheduling program 213 of the node 110C through a calculation method which will be described later with reference to FIG. 14.

FIG. 14 is an explanatory diagram of the shutdown schedule table 1400 held by each node 110 according to the first embodiment of this invention.

The shutdown schedule table 1400 is stored in the memory 204 of each node 110 as a part of the control information 214.

The scheduling program 213 of each node 110 creates the shutdown schedule table 1400 based on the contents of the administrator setting table 1300. Specifically, the shutdown schedule table 1400 and the administrator setting table 1300 share the same item fields. In other words, the shutdown schedule table 1400 contains a NAS field 1401, a power saving level field 1402, a power saving time field 1403, and a return time field 1404.

When specific values entered by the NAS administrator are held in the item fields of the administrator setting table 1300, the scheduling program 213 stores the same values in the corresponding item fields of the shutdown schedule table 1400.

For instance, the administrator setting table 1300 of FIG. 13 holds "1", "23:00", and "05:00" in the power saving level field 1302, the power saving time field 1303, and the return time field 1304, respectively, for the node 110B. Then the scheduling program 213 stores "1", "23:00", and "05:00" in the power-saving level field 1402, the power saving time field 1403, and the return time field 1404, respectively, for the node 110B in FIG. 14.

In the case where an item field of the administrator setting table 1300 holds "auto", the scheduling program 213 calculates a value to be stored in the corresponding item field of the shutdown schedule table 1400.

For instance, "auto" is stored in the power saving time field 1303 and the return time field 1304 for the node 110C in the administrator setting table 1300 of FIG. 13. Then the scheduling program 213 calculates a time at which the node 110C should shift from the operational mode to the power saving level 3 and a time at which the node 110C should return from the power saving level 3 to the operational mode.

This calculation may be performed based on information stored in the collected information table 1200. For example, in the case where the load on the node 110C is smaller than a given threshold from 20:00 to 8:00 and is larger than the given threshold at other times, the scheduling program 213 may calculate "20:00" and "08:00" as the power saving time and the return time, respectively, and store the calculated values in the power saving time field 1403 and the return time 1404 for the node 110C in the shutdown schedule table 1400.

The scheduling program 213 may calculate a value to be stored in the power saving level field 1402. This calculation, too, may be performed based on information stored in the collected information table 1200. In calculating values to be stored in the power saving level field 1402, the power saving time field 1403, and the return time 1404, the scheduling program 213 may refer to a power saving level policy table 1500 shown in FIG. 15.

FIG. 15 is an explanatory diagram of the power saving level policy table 1500 which is kept in each node 110 according to the first embodiment of this invention.

The power saving level policy table 1500 is stored in the memory 204 of each node 110 as a part of the control information 214.

The power saving level policy table 1500 contains a power saving level field 1501 and a condition field 1502.

The power saving level field 1501 is for registering a power saving level that can be set to each node 110. For example, four power saving levels ranging from "0" to "3" can be set to each node 110 as shown in FIG. 4.

The condition field 1502 is for registering a condition that has to be met to set a power saving level indicated by the power saving level field 1501 to each node 110. In other words, when one node 110 satisfies a condition written in the condition field 1502, a power saving level written in the power saving level field 1501 of the same record is set to this node 110.

For example, a record of the power saving level policy table 1500 shown in FIG. 15 that has a value "0" in its power saving level field 1501 holds "(X1<CPU load<X2) AND (Y1<I/O load<Y2) AND (Z1<file access count<Z2)" in its condition field 1502. X1, X2, Y1, Y2, Z1, and Z2 represent thresholds determined in advance by, for example, the NAS administrator. Similarly, X3 to X8, Y3 to Y8, and Z3 to Z8 represent thresholds determined in advance by the NAS administrator. The scheduling program 213 in this example may create the shutdown schedule table 1400 such that the nodes 110 are set to the power saving level 0 at a time when the load satisfies the above condition by referring to the collected information table 1200 and the power saving level policy table 1500.

FIG. 16 is an explanatory diagram of a NAS management table 1600 which is kept in each node 110 according to the first embodiment of this invention.

The NAS management table 1600 is stored in the memory 204 of each node 110 as a part of the control information 214.

The NAS management table 1600 contains management information indicating the state and the like of each node 110. The management information shown in the example of FIG. 16 contains a state 1611, a failover pair 1612, and a path 1613. A NAS-01 field 1601, NAS-02 field 1602, and NAS-03 field 1603 of the NAS management table 1600 holds management information of the node 110A, the node 110B, and the node 110C, respectively.

The state 1611 indicates the power consumption level set to the nodes 110.

The failover pair 1612 indicates the identifier of the other node 110 that forms a failover pair with the node 110 in question. Details of the failover pair will be described later with reference to FIG. 22. In the example of FIG. 16, "NAS-02" is stored as the failover pair 1612 in the NAS-01 field 1601, and "NAS-01" is stored as the failover pair 1612 in the NAS-02 field 1602. This indicates that the node 110A and the node 110B form one failover pair.

The path 1613 indicates the state (enabled or disabled) of the paths 301 connected to the individual node 110. In the example of FIG. 16, "ON" indicates that the path has been enabled whereas "OFF" indicates that the path has been disabled.

FIG. 16 shows as an example the NAS management table 1600 that is kept in each node 110 shown in FIG. 7.

In this example where the nodes 110A and 110B are in operation and the node 110C is set to the power saving level 3, "power saving level 0", "power saving level 0", and "power saving level 3" are stored as the state 1611 for the node 110A, the node 110B, and the node 110C, respectively.

The enabled paths in this example are the paths 301A, 301C, and 301E. Accordingly, "ON" is stored as the path 1613 for the paths 301A, 301C, and 301E as information indicating a path state whereas "OFF" is stored as the path 1613 for the rest of the paths 301 as information indicating a path state.

In the example of FIG. 16 where the node 110A and the node 110B form one failover pair, the identifiers of the paired nodes, "NAS-02" and "NAS-01" are stored as the failover pair 1612 for the node 110A and the node 110B, respectively.

FIG. 17 is an explanatory diagram of a file access information table 1700 which is kept in each node 110 according to the first embodiment of this invention.

The scheduling program 213 of each node 110 stores the history of file access made by the node 110 in the file access information table 1700. The file access information table 1700 is stored in the memory 204 of each node 110 as a part of the control information 214.

The file access information table 1700 contains a file field 1701, an access date/time field 1702, an access type field 1703, and an access source field 1704.

The file field 1701 is for registering the file name of the accessed file 303.

The access date/time field 1702 is for registering the date and time when the file access is executed.

The access type field 1703 is for registering the type of the executed access (read access or write access).

The access source field 1704 is for registering the identifier of an access source of the executed access.

FIG. 17 shows an example of the file access information table 1700 that is kept in the node 110B. A first record of the file access information table 1700 shown in FIG. 17 holds "mnt/FS2/HTML-2.html", "2007/05/05 16:40", "read", and "NAS-01" in the file field 1701, the access date/time field 1702, the access type field 1703, and the access source field 1704, respectively. This means that the node 110B has received a read request from the node 110A on May 5, 2007 at 16:40 to read a file "mnt/FS2/HTML-2.html", and has executed the requested read access.

On the other hand, a second record of the file access information table 1700 holds "mnt/FS2/bbb.txt", "2007/05/07 12:00", "read", and "Client-A" in the file field 1701, the access date/time field 1702, the access type field 1703, and the access source field 1704, respectively. This means that the node 110B has received a read request from the NAS client 160 that is identified by an identifier "Client-A" on May 7, 2007 at 12:00 to read a file "mnt/FS2/bbb.txt", and has executed the requested read access.

In each node 110, whenever the node 110 executes file access, the scheduling program 213 sequentially adds information on the executed file access to the file access information table 1700.

Figure 18:
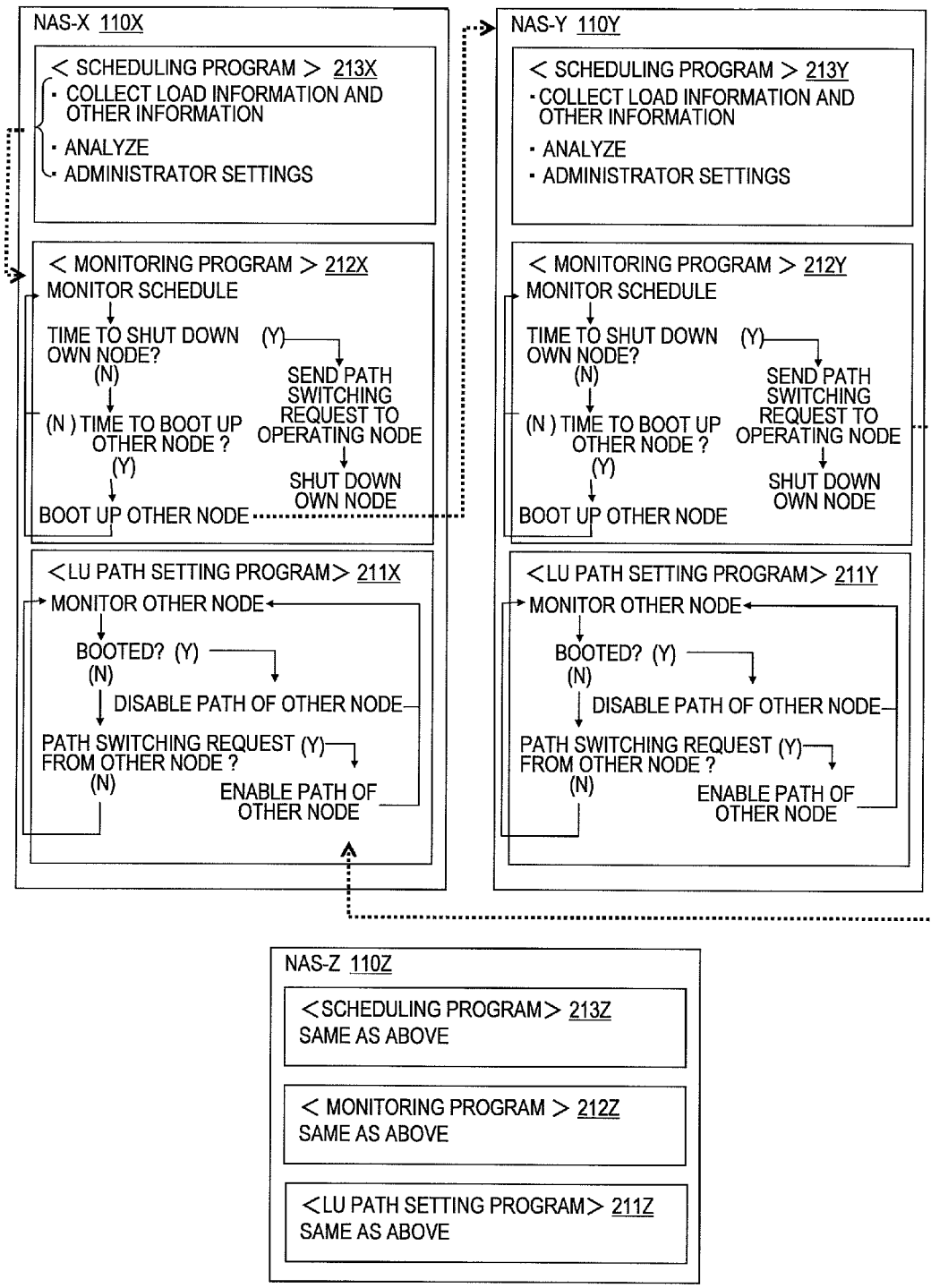
FIG. 18 is an explanatory diagram outlining processing that is executed by programs of each node 110 according to the first embodiment of this invention.

FIG. 18 is an explanatory diagram outlining processing that is executed by programs of each node 110 according to the first embodiment of this invention.

FIG. 18 shows the outline of processing executed by programs of a node 110X which is identified by an identifier "NAS-X", a node 110Y which is identified by an identifier "NAS-Y", and a node 110Z which is identified by an identifier "NAS-Z".

The node 110X is the node 110 that is in operation all the time. The node 110X corresponds to the node 110A in the example of FIG. 6. The node 110Y is the node 110 that is set to the power saving level 1 at a given time. The node 110Y corresponds to the node 110B in the example of FIG. 6. The node 110Z is neither like the node 110X nor the node 110Y. The node 110Z corresponds to the node 110C in the example of FIG. 6.

In the following description, the LU path setting program 211, the monitoring program 212, and the scheduling program 213 in the node 110X will be referred to as LU path setting program 211X, monitoring program 212X, and scheduling program 213X. Suffixes "Y" and "Z" will be attached in a similar manner to the reference numerals of programs in the node 110Y and programs in the node 110Z.

The scheduling program 213X obtains the load information of each node 110 at a given timing and accumulates the obtained information in the collected information table 1200. The scheduling program 213X also analyzes values accumulated in the collected information table 1200 and values stored in the administrator setting table 1300 to create the shutdown schedule table 1400.

The monitoring program 212X refers to the created shutdown schedule table 1400 and time information indicating the current time to judge whether or not the time to shift to a power saving mode has arrived for its own node 110 (i.e., the node 110X which is running the monitoring program 212X).

When the time to shift to a power saving mode arrives for the own node 110X, the monitoring program 212X sends a path switching request to the other nodes 110 and then shifts the own node 110X to a power saving mode.

When it is not time yet for the own node 110X to shift to a power saving mode, the monitoring program 212X judges whether or not the current time is a time when any of the other nodes 110 is to be booted.

In the case where one of the other nodes 110 (for example, the node 110Y) is to be booted at the current time, the monitoring program 212X boots up the node 110Y.

In the case where none of the other nodes 110 is to be booted at the current time, the monitoring program 212X refers again to the shutdown schedule table 1400 and other information to judge whether or not the time to shift to a power saving mode has arrived for the own node 110X.

The scheduling program 213Y, the monitoring program 212Y, and the LU path setting program 211Y in the node 110Y execute the same processing that is executed by the scheduling program 213X, the monitoring program 212X, and the LU path setting program 211X in the node 110X. However, in the example of FIG. 18, the node 110Y shifts to a power saving mode at a given time whereas the node 110X is in operation all the time. The following description deals only with processing that is executed upon shifting of the node 110Y to a power saving mode. The rest of the processing executed by the node 110Y is the same as the processing performed in the node 110X, and will not be mentioned in the following description.

The monitoring program 212Y judges whether or not the time to shift to a power saving mode has arrived for its own node 110 (i.e., the node 110Y which is running the monitoring program 212Y).

When the time to shift to a power saving mode arrives for the own node 110Y, the monitoring program 212Y sends a path switching request to the other nodes 110 (in the example of FIG. 18, the node 110X which is in operation all the time) and then shifts the own node 110Y to a power saving mode.

The LU path setting program 211X of the node 110X judges whether or not any of the other nodes 110 has booted up (i.e., returned from a power saving mode).

In the case where one of the other nodes 110 has been booted, the LU path setting program 211X chooses, out of the paths 301 available to the own node 110X, one leading to the LU 129 that is used by the booted node 110, and disables this path 301.

In the case where none of the other nodes 110 has been booted, the LU path setting program 211X judges whether or not a path switching request has been received from the other nodes 110.

When a path switching request is received from the other nodes 110, for example, the node 110Y, the LU path setting program 211X enables the path 301 leading from the own node 110X to the LU 129 that has been used by the node 110Y.

Programs in the node 110Z execute the same processing that is executed by the programs in the nodes 110X and 110Y, and a description thereof will be omitted.

Details of the processing executed by the programs of each node 110 will now be described.

Figure 19:
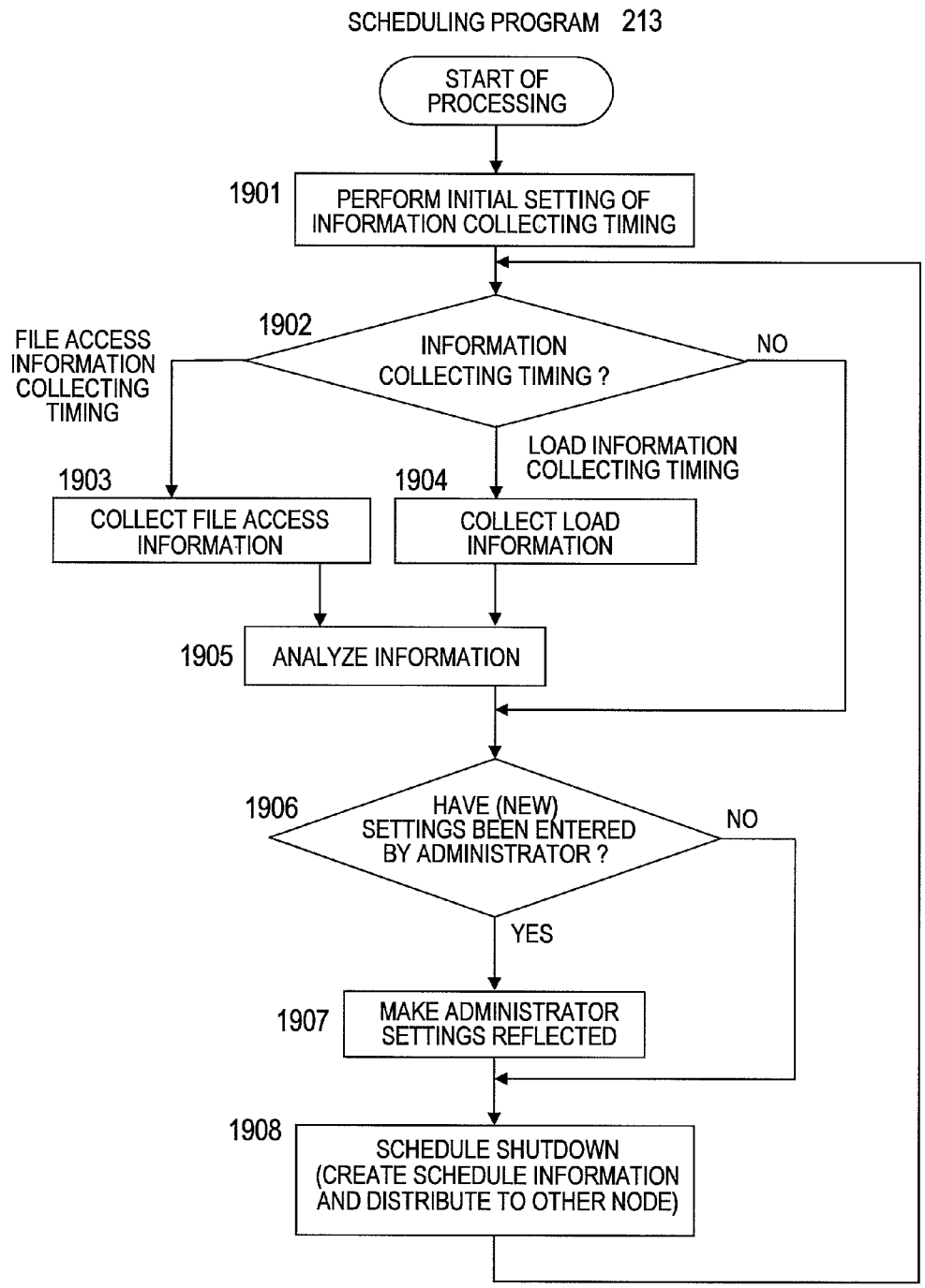
FIG. 19 is a flow chart of processing that is executed by a scheduling program according to the first embodiment of this invention.

FIG. 19 is a flow chart of processing that is executed by the scheduling program 213 according to the first embodiment of this invention.

First, the scheduling program 213 sets initial values for an information collecting timing (Step 1901). The information collecting timing is when to obtain load information and other information that is to be stored in the collected information table 1200. For example, in the case of obtaining load information and other information at regular intervals, the interval may be set as the information collecting timing. Alternatively, in the case of obtaining load information and other information at a given time, the time may be set as the information collecting timing.

Next, the scheduling program 213 judges whether or not the current time is the information collecting timing set in Step 1901 (whether or not the information collecting timing set in Step 1901 has arrived) (Step 1902).

When it is judged in Step 1902 that the current time is the time to collect file access information, the scheduling program 213 collects file access information (Step 1903). For instance, the scheduling program 213 obtains from the file access information table 1700 the count of files executed by the own node 110 between the last information collecting timing and this information collecting timing. The scheduling program 213 also obtains from the file access information tables 1700 of other nodes 110 the counts of files executed by the other nodes 110 between the last information collecting time and this information collecting time. The scheduling program 213 stores the obtained file access counts in the own file access information table 1700.

When it is judged in Step 1902 that the current time is the time to collect load information, the scheduling program 213 collects load information (Step 1904). For instance, the scheduling program 213 obtains CPU load and I/O load values of the own node 110. The scheduling program 213 also obtains CPU load and I/O load values of other nodes 110 at this information collecting timing from the other nodes 110. The scheduling program 213 stores the obtained load values in the collected information table 1200.

When it is judged in Step 1902 that the current time is not the information collecting timing, the scheduling program 213 executes neither Step 1903 nor Step 1904 and proceeds to Step 1905.

In Step 1905, the scheduling program 213 analyzes the information collected in Step 1903 or Step 1904, thereby calculating values to be registered in the shutdown schedule table 1400. Specifically, the scheduling program 213 can determine values to be registered in the power saving level field 1402, the power saving time field 1403, and the return time field 1404 for the individual node 110 in the manner described above with reference to FIGS. 14 and 15.

The scheduling program 213 next judges whether or not the NAS administrator has entered new settings (Step 1906).

When it is judged in Step 1906 that the NAS administrator has entered new settings, the scheduling program 213 makes the entered new settings reflected in the administrator setting table 1300 (Step 1907).

When it is judged in Step 1906 that no new settings have been entered by the NAS administrator, the scheduling program 213 advances to Step 1908 without executing Step 1907.

The scheduling program 213 creates (or updates) the shutdown schedule table 1400 in Step 1908. Specifically, the scheduling program 213 copies values stored in the administrator setting table 1300 to the shutdown schedule table 1400. In copying the values, the scheduling program 213 identifies which one of values calculated in Step 1905 is for an item whose field in the administrator setting table 1300 holds "auto", and stores this value in the corresponding item field of the shutdown schedule table 1400.

In Step 1908, the scheduling program 213 also sends some values in the updated shutdown schedule table 1400 to other nodes 110. The sent values are those stored in the updated power saving level field 1402, power saving time field 1403, and return time field 1404 in association with the own node 110. The other nodes 110 which have received those values store the received values in their respective shutdown schedule tables 1400 in an entry for the sender node 110. By communicating table values with one another in this manner, data in the shutdown schedule tables 1400 is kept consistent throughout all the nodes 110.

The scheduling program 213 then returns to Step 1902 to execute Step 1902 and subsequent steps repeatedly.

Figure 20:
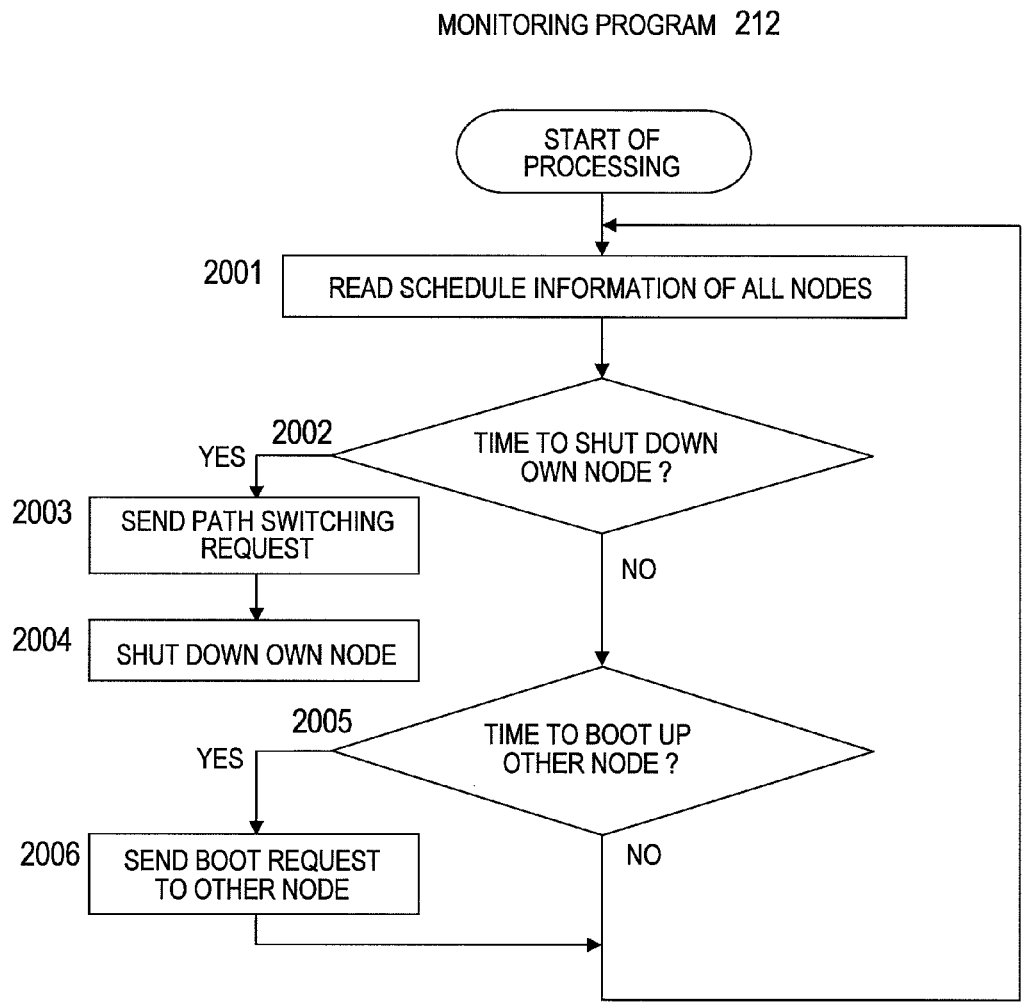
FIG. 20 is a flow chart of processing that is executed by monitoring program according to the first embodiment of this invention.

FIG. 20 is a flow chart of processing that is executed by the monitoring program 212 according to the first embodiment of this invention.

First, the monitoring program 212 reads shutdown schedules of all the nodes 110 (the contents of the shutdown schedule table 1400) (Step 2001).

Next, based on the shutdown schedules read in Step 2001, the monitoring program 212 judges whether or not the time to shut down has arrived for its own node 110 (Step 2002). Specifically, the monitoring program 212 judges that the time to shut down has arrived for the own node 110 when the current time reaches a time stored in the power saving time field 1403 in association with the own node 110. For example, the monitoring program 212 of the node 110C judges at a time shown in FIG. 7 that it is time for the own node 110 to shut down and the monitoring program 212 of the node 110B makes the same judgment at a time shown in FIG. 8.

However, when the own node 110 alone is in the operational mode in the system shown in FIG. 1, for example, the monitoring program 212 may judge that the time to shut down has not arrived for the own node 110 regardless of its shutdown schedule.

When it is judged in Step 2002 that it is time for the own node 110 to shut down, the monitoring program 212 sends a path switching request to the LU path setting programs 211 of other nodes 110 (Step 2003). This path switching request is contained in the takeover request shown in FIGS. 7 and 8.

The monitoring program 212 next shifts the own node 110 to a power saving level set in the shutdown schedule table 1400 (Step 2004). This stops the providing of a service from the own node 110 to the NAS clients 160.

When it is judged in Step 2002 that it is not yet time for the own node 110 to shut down, the monitoring program 212 judges whether or not a time to boot up one of the other nodes 110 has arrived (Step 2005). Specifically, as shown in FIG. 9, the monitoring program 212 judges that a time to boot up one of the other nodes 110 has arrived when the current time reaches a time stored in the return time field 1404 in association with the node 110. The monitoring program 212 judges that it is time to boot up other nodes 110 also when a failure occurs in the own node 110 and when the load on the own node 110 exceeds a given threshold as shown in FIGS. 10 and 11.

When it is judged in Step 2005 that a time to boot up one of the other nodes 110 has arrived, the monitoring program 212 sends a boot request to the other node 110 as shown in FIGS. 9 to 11 (Step 2006).

When it is judged in Step 2005 that the time to boot has arrived for none of the other nodes 110, or when Step 2006 is executed, the monitoring program 212 returns to Step 2001 to execute Step 2001 and subsequent steps repeatedly.

Figure 21:
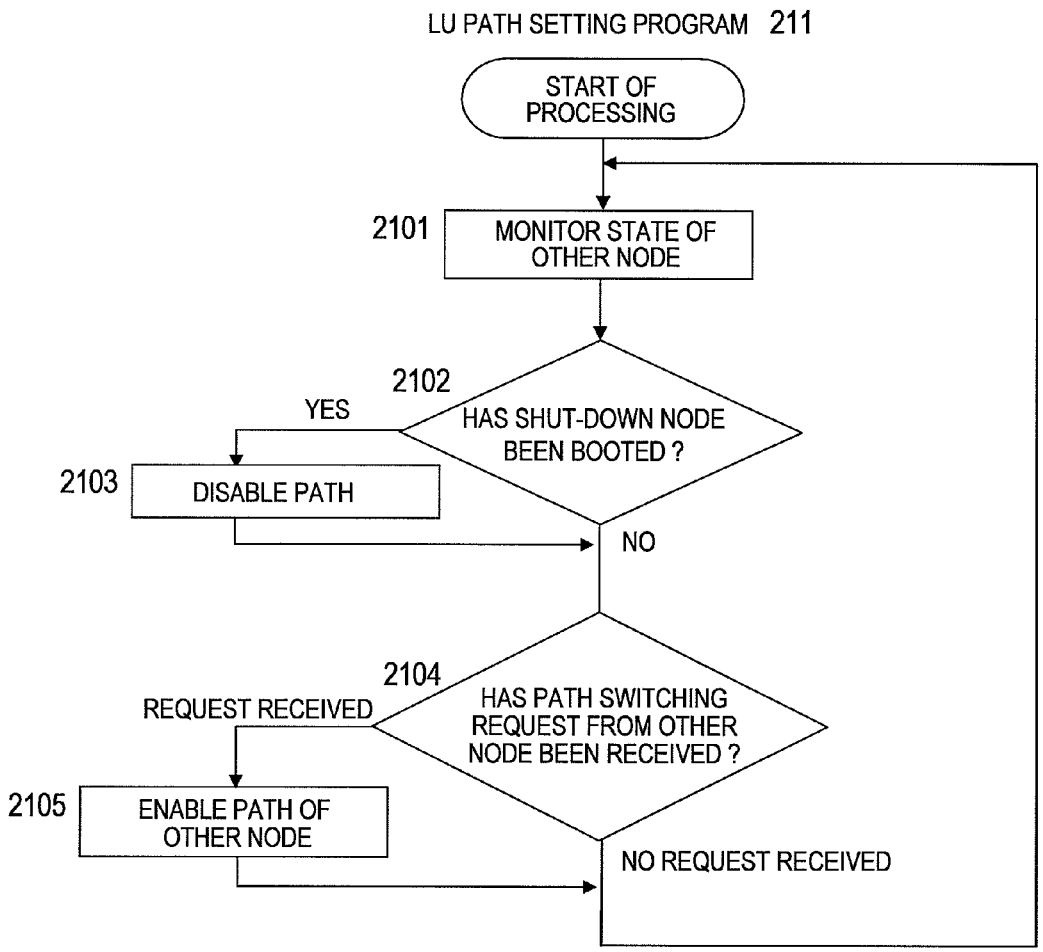

FIG. 21 is a flow chart of processing that is executed by the LU path setting program 211 according to the first embodiment of this invention.

First, the LU path setting program 211 monitors the state of other nodes 110 (Step 2101). For instance, the LU path setting program 211 may send a state monitoring request to all the other nodes 110 to monitor the state of the other nodes 110 based on responses to the request.

Next, the LU path setting program 211 judges whether or not any of other nodes 110 that have been shut down are now booted (whether or not at least one of the other nodes 110 has shifted from a power saving mode to the operational mode) (Step 2102).

When it is judged in Step 2102 that at least one of the other nodes 110 that have been shut down is now booted, the LU path setting program 211 disables the path 301 that has been set to the LU 129 that is now to be managed by the newly booted node 110. For example, in the case where it is the node 110B that is newly booted as shown in FIG. 9, the LU 129B which has been managed by the node 110A is now managed by the node 110B. Then, the LU path setting program 211 of the node 110A disables the path 301B.

When it is judged in Step 2102 that the other nodes 110 that have been shut down are still down, or when Step 2103 is executed, the LU path setting program 211 judges whether or not a path switching request has been received from any of the other nodes 110 (Step 2104). This path switching request is the one sent in Step 2003 of FIG. 20.

When it is judged in Step 2104 that the path switching request has been received, the LU path setting program 211 enables the path 301 that is indicated by the received path switching request. For example, in the example of FIG. 7, the LU path setting program 211 of the node 110A receives a takeover request from the node 110C and enables the path 301C in accordance with a path switching request contained in the takeover request.

When it is judged in Step 2104 that the path switching request has not been received, or when Step 2105 is executed, the LU path setting program 211 returns to Step 2101 to execute Step 2101 and subsequent steps repeatedly.

In the first embodiment of this invention described above, a shutdown schedule according to a given condition is set, as a general rule, for each node 110 separately. This causes each node 110 to shift to a power saving mode when a time stored in the power saving time field 1403 in association with the node 110 arrives irrespective of whether other nodes 110 are in the operational mode or not.

Instead of the thus individually set shutdown schedules, an operation state set to the entire disk subsystem 100 may be used to determine what operation state the nodes 110 should be in.

Figure 22:
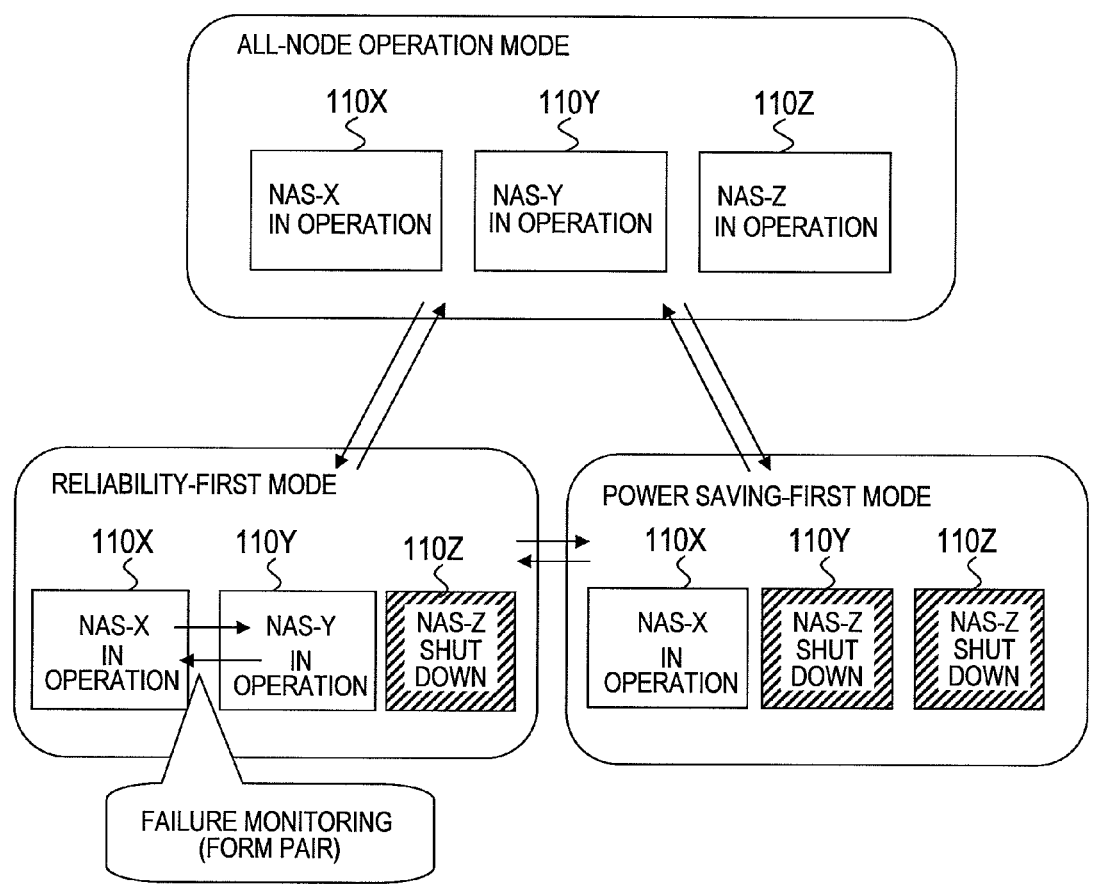
FIG. 22 is an explanatory diagram showing an example of operation states of the nodes which are determined from an operation state set to an entire disk subsystem according to the first embodiment of this invention.

FIG. 22 is an explanatory diagram showing an example of operation states of the nodes 110 which are determined from an operation state set to the entire disk subsystem 100 according to the first embodiment of this invention.

When the disk subsystem 100 frequently receives access requests, for instance, it is desirable to put all of the nodes 110 into operation in order to balance the load applied by those access requests and thereby avoid a drop in performance.

When the disk subsystem 100 receives access requests infrequently, on the other hand, the access requests can be processed by fewer nodes 110. A single node 110 (for example, the node 110X shown in FIG. 22) in operation can process all access requests when the frequency of access requests is low enough.

In this way, setting one node 110 alone to the operational mode while setting the rest of the nodes 110 to a power saving mode when the access frequency or the like meets a given condition can minimize power consumed by the disk subsystem 100.

However, as in a batch job at night, there are cases where high reliability is required despite low access frequency. In such cases, it is desirable to put at least two nodes 110 in constant operation. With two nodes 110 (for example, the nodes 110X and 110Y in FIG. 22) in operation, a failure in one of the nodes 110 does not interrupt access processing since the other node 110 immediately takes over the processing.

An operation state where only one node 110 is set to the operational mode for minimized power consumption as described above will hereinafter be referred to as "power saving-first mode". An operation state where at least two nodes 110 are set to the operational mode for ensured reliability will hereinafter be referred to as "reliability-first mode". An operation state where all the nodes 110 are put into operation will be referred to as "all-node operation mode". The all-node operation mode is a mode in which processing performance and reliability are given importance over cutting power consumption. Those modes indicate operation states set to the computer system as described above.

In the reliability-first mode, two operating nodes 110 monitor each other for failure. When a failure occurs in one of the two operating nodes 110, the other node 110 takes over a service that has been provided by the failed node 110. A pair of nodes 110 which monitor each other in this manner will be referred to as failover pair in the following description.

FIG. 23 is an explanatory diagram of a priority mode policy table 2300 which is kept in each node 110 according to the first embodiment of this invention.

The priority mode policy table 2300 is stored in the memory 204 of each node 110 as a part of the control information 214.

The priority mode policy table 2300 contains a mode field 2301 and a condition field 2302.

The mode field 2301 is for registering an operation state that can be set to the disk subsystem 100. For instance, as shown in FIG. 23, one of the "all-node operation mode", the "reliability-first mode", and the "power saving-first mode" can be set to the disk subsystem 100.

The condition field 2302 is for registering a condition that has to be met to set an operation state indicated by the mode field 2301 to the disk subsystem 100. In other words, when a condition written in the condition field 2302 is satisfied, an operation state that is associated with the condition written in the condition field 2302 is set to the disk subsystem 100.

For example, a record of the priority mode policy table 2300 in FIG. 23 that has a value "reliability first" in its mode field 2301 holds "(X3<CPU load<X4) AND (Y3<I/O load<Y4) AND (Z3<file access count<Z4)" in its condition field 2302. X3, X4, Y3, Y4, Z3, and Z4 represent thresholds determined in advance by, for example, the NAS administrator. Similarly, X1 to X8, Y1 to Y8, and Z1 to Z8 represent thresholds determined in advance by the NAS administrator. The scheduling program 213 in this example may create a priority mode schedule table 2400, which will be described later, such that the disk subsystem 100 is set to the reliability-first mode at a time when the load satisfies the above condition by referring to the collected information table 1200 and the priority mode policy table 2300.

FIG. 24 is an explanatory diagram of the priority mode schedule table 2400 which is kept in each node 110 according to the first embodiment of this invention.

The priority mode schedule table 2400 is stored in the memory 204 of each node 110 as a part of the control information 214.

The priority mode schedule table 2400 contains a time field 2401 and a mode field 2402.

An operation state set to the disk subsystem 100 at a time written in the time field 2401 is stored in the mode field 2402.

For example, when it is judged from the collected information table 1200 that the load information and other information collected between 17:00 and 20:00 meet the condition "(X3<CPU load<X4) AND (Y3<I/O load<Y4) AND (Z3<file access count<Z4)", "reliability first" is stored in the mode field 2402 in association with a value "17:00~20:00" in the time field 2401.

In the description given above on FIGS. 23 and 24, an operation node to be set to the disk subsystem 100 is determined based on the load information and other information of the nodes 110. However, a different method may be employed in determining what operation state should be set to the disk subsystem 100. For instance, the scheduling program 213 may create the priority mode schedule table 2400 such that the disk subsystem 100 is in the reliability-first mode during a time slot in which processing that requires high reliability is executed.

To give a more specific example, in the case where only some of the NAS clients 160 execute processing that requires high reliability, the scheduling program 213 may refer to the file access information table 1700 to create the priority mode schedule table 2400 such that the disk subsystem 100 is in the reliability-first mode during a time slot in which access requests are received from the NAS clients 160 that execute processing requiring high reliability.

Alternatively, the priority mode schedule table 2400 may be created manually by the NAS administrator to suit the type of processing executed in the respective time slots.

Figure 25:
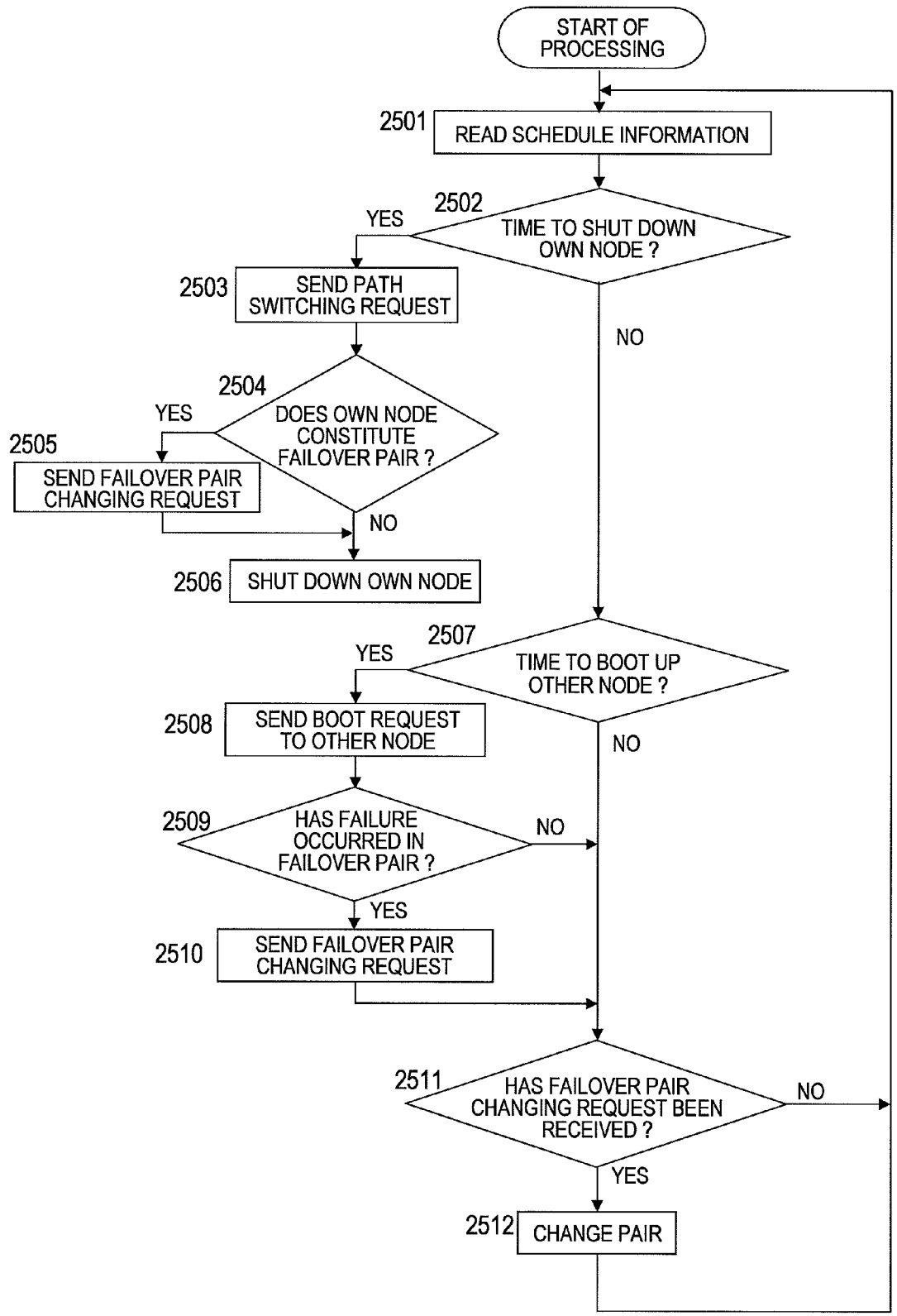
FIG. 25 is a flow chart of processing that is executed by the monitoring program based on an operation state of the entire disk subsystem according to the first embodiment of this invention.

FIG. 25 is a flow chart of processing that is executed by the monitoring program 212 based on the operation state of the entire disk subsystem 100 according to the first embodiment of this invention.

First, the monitoring program 212 reads the priority mode schedule table 2400 (Step 2501).

Next, the monitoring program 212 judges whether or not the time to shut down has arrived for its own node 110 (Step 2502). An example of processing executed in Step 2502 will be described later in detail with reference to FIG. 26.

When it is judged in Step 2502 that the time to shut down has arrived for the own node 110, the monitoring program 212 sends a path switching request to the LU path setting programs 211 of the other nodes 110 (Step 2503). This switching request is contained in the takeover request shown in FIGS. 7 and 8.

The monitoring program 212 next judges whether or not the own node 110 belongs to a failover pair (Step 2504). Specifically, the monitoring program 212 refers to the NAS management table 1600 shown in FIG. 16 and, when the identifier of another node is stored as the failover pair 1612 in association with the own node 110, judges that the own node 110 belongs to a failover pair.

In the example of FIG. 16, the node 110A (NAS-01) and the node 110B (NAS-02) form one failover pair. Then the monitoring programs 212 of the node 110A and the node 110B judge in Step 2504 that the own node 110 belongs to a failover pair.

When it is judged in Step 2504 that the own node 110 belongs to a failover pair, it means that the disk subsystem 100 is in the reliability-first mode. When the own node 110 stops operating at this point, the other node 110 belonging to the failover pair is monitored by none of the nodes 110 and the reliability is lowered. To maintain the reliability, the monitoring program 212 has to create a new failover pair which does not include the own node 110 before the own node 110 shuts down. The monitoring program 212 therefore sends a failover pair changing request to the monitoring programs 212 of the other nodes 110 (Step 2505).

When it is judged in Step 2504 that the own node 110 does not belong to a failover pair, or when Step 2505 is executed, the monitoring program 212 shifts the own node 110 to a power saving mode (Step 2506).

When it is judged in Step 2502 that it is not yet time for the own node 110 to shut down, the monitoring program 212 judges whether or not the time to be booted has arrived for any of the other nodes 110 (Step 2507). An example of processing executed in Step 2507 will be described later in detail with reference to FIG. 27.

When it is judged in Step 2507 that the time to be booted has arrived for none of the other nodes 110, the monitoring program 212 proceeds to Step 2511.

On the other hand, when it is judged in Step 2507 that it is time to boot up one of the other nodes 110, the monitoring program 212 sends a boot request to this other node 110 as shown in FIGS. 9 to 11 (Step 2508).

The monitoring program 212 next judges whether or not a failure has occurred in the nodes 110 belonging to the failover pair (Step 2509).

When it is judged in Step 2509 that a failure has not occurred in the nodes 110 belonging to the failover pair, there is no need to change the failover pair and the monitoring program 212 proceeds to Step 2511.

When it is judged in Step 2509 that a failure has occurred in the nodes 110 belonging to the failover pair, a new failover pair has to be formed in order to maintain the reliability. The monitoring program 212 therefore sends a failover pair changing request to the node 110 that has been booted up in Step 2508 (Step 2510).

Next, the monitoring program 212 of the recipient node 110 judges whether or not a failover pair changing request has been received (Step 2511). Specifically, the monitoring program 212 judges whether or not it has received the failover pair changing request sent in Step 2505 or 2510 from the other node 110.

When it is judged in Step 2511 that the failover pair changing request has been received, the monitoring program 212 breaks up the existing failover pair and creates a new failover pair (Step 2512).

Specifically, when the failover pair changing request sent in Step 2505 from the monitoring program 212 of the other node 110 is received, the recipient monitoring program 212 creates a new failover pair composed of the own node 110 and one of the currently operating nodes 110 that is not the sender of the failover pair changing request (for example, the node 110 booted in Step 2508).

When the failover pair changing request sent in Step 2510 from the monitoring program 212 of the other node 110 is received, the recipient monitoring program 212 creates a new failover pair composed of the own node 110 and the sender of the failover pair changing request.

After executing Step 2512, the monitoring program 212 returns to Step 2501 to execute Step 2501 and subsequent steps repeatedly.

In the case where it is judged in Step 2511 that a failover pair changing request has not been received, the monitoring program 212 returns to Step 2501 without executing Step 2512.

Figure 26:
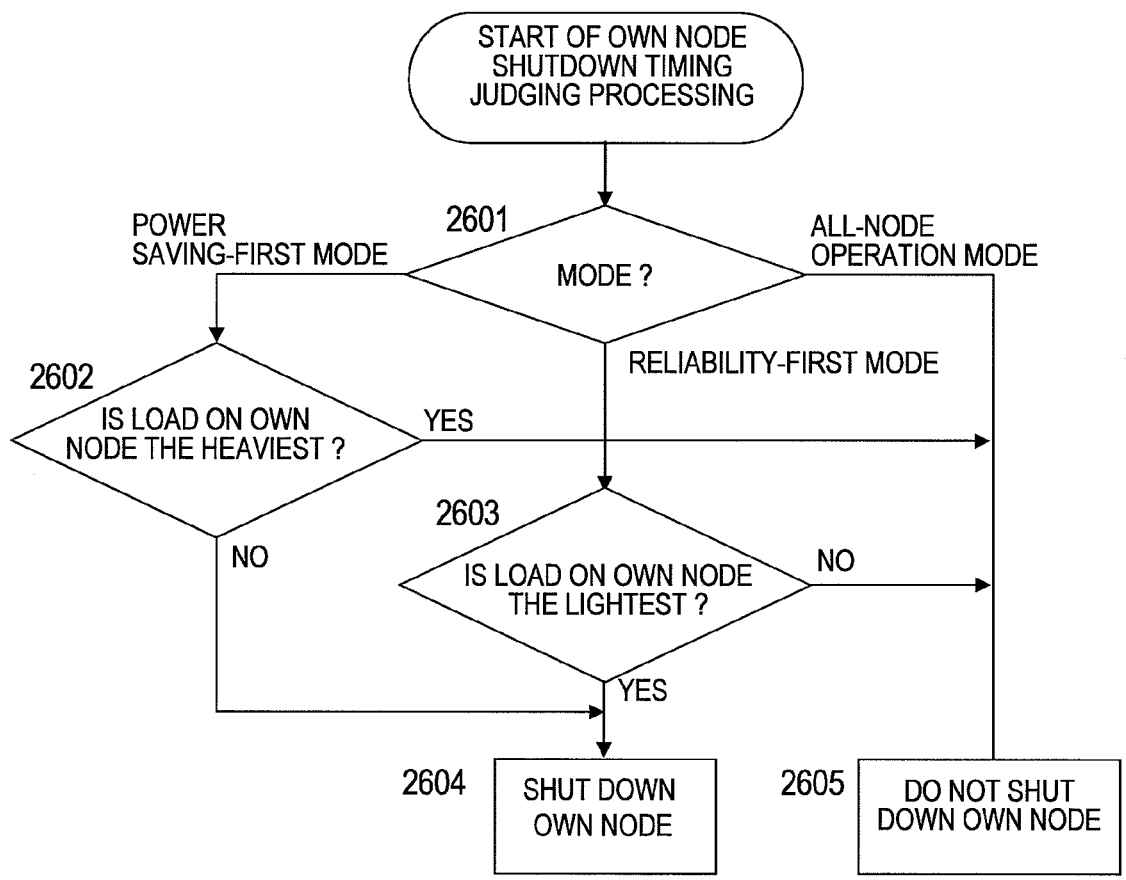
FIG. 26 is a flow chart of processing that is executed by the monitoring program to judge when to shut down the own node according to the first embodiment of this invention.

FIG. 26 is a flow chart of processing that is executed by the monitoring program 212 to judge when to shut down the own node 110 according to the first embodiment of this invention.

Specifically, FIG. 26 shows an example of processing executed by the monitoring program 212 in Step 2502 of FIG. 25.

First, the monitoring program 212 judges what mode is currently set to the disk subsystem 100 (Step 2601).

When it is judged in Step 2601 that the disk subsystem 100 is in the power saving-first mode, the monitoring program 212 judges whether or not the load on the own node 110 is the heaviest of the nodes 110 that are contained in the disk subsystem 100 (Step 2602).

When it is judged in Step 2602 that the load on the own node 110 is the heaviest one, the monitoring program 212 judges that it is not yet time for the own node 110 to shut down (Step 2605).

On the other hand, when it is judged in Step 2602 that the load on the own node 110 is not the heaviest (in other words, the load on the own node 110 is lighter than that of at least one of the other nodes 110), the monitoring program 212 judges that the time to shut down has arrived for the own node 110 (Step 2604).

In this manner, when the disk subsystem 100 is in the power saving-first mode, it is judged that all other nodes 110 than the one whose load is the heaviest should be shut down.

When it is judged in Step 2601 that the disk subsystem 100 is in the reliability-first mode, the monitoring program 212 judges whether or not the load on the own node 110 is the lightest of the nodes 110 that are contained in the disk subsystem 100 (Step 2603).

When it is judged in Step 2603 that the load on the own node 110 is not the lightest one, the monitoring program 212 judges that it is not yet time for the own node 110 to shut down (Step 2605).

When it is judged in Step 2603 that the load on the own node 110 is the lightest, the monitoring program 212 judges that the time to shut down has arrived for the own node 110 (Step 2604). However, in the case where the number of the nodes 110 in the disk subsystem 100 that are in operation is two or less, the monitoring program 212 judges that it is not yet time for the own node 110 to shut down (Step 2605).

In this manner, when the disk subsystem 100 is in the reliability-first mode, it is judged that the node 110 whose load is the lightest should be shut down while at least two nodes 110 are put into operation.

The "load" used in the judging of Steps 2602 and 2603 can be any indicator as long as it indicates the load on the individual nodes 110. For instance, the load employed may be one of the CPU load, the I/O load, and the file access count that are stored in the collected information table 1200, or may be an indicator calculated from those values in the collected information table 1200.

Figure 27:
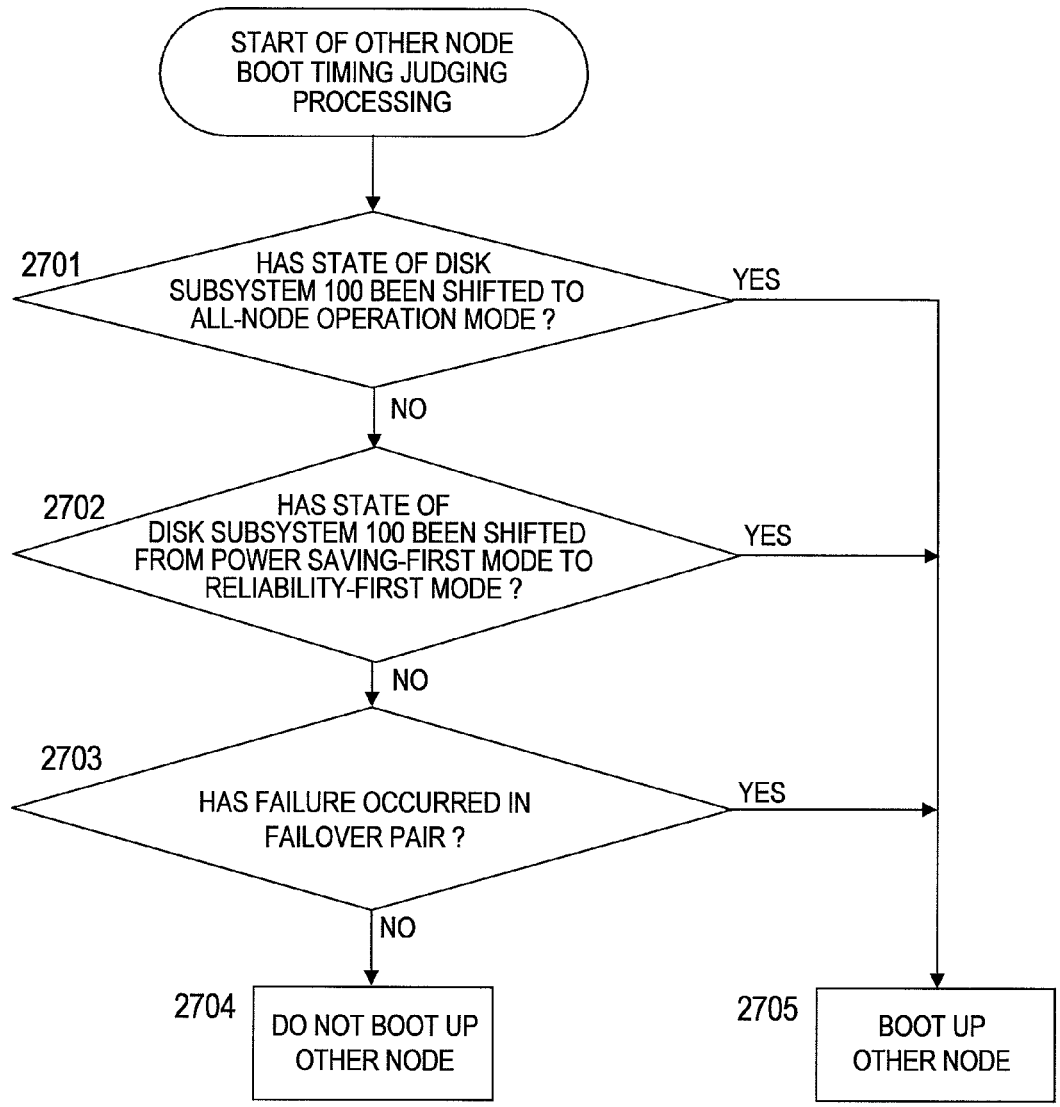
FIG. 27 is a flow chart of processing that is executed by the monitoring program to judge when to boot up other nodes according to the first embodiment of this invention.

FIG. 27 is a flow chart of processing that is executed by the monitoring program 212 to judge when to boot up other nodes 110 according to the first embodiment of this invention.

Specifically, FIG. 27 shows an example of processing executed by the monitoring program 212 in Step 2507 of FIG. 25.

The monitoring program 212 judges whether or not the disk subsystem 100 has shifted to the all-node operation mode from the reliability-first mode or the power saving-first mode (Step 2701).

When it is judged in Step 2701 that the disk subsystem 100 has shifted to the all-node operation mode from the reliability-first mode or the power saving-first mode, the monitoring program 212 judges that the time to boot up has arrived for one of the other nodes 110 (Step 2705).

When it is judged in Step 2701 that the disk subsystem 100 has not shifted to the all-node operation mode from the reliability-first mode or the power saving-first mode, the monitoring program 212 judges whether or not the disk subsystem 100 has shifted to the reliability-first mode from the power saving-first mode (Step 2702).

When it is judged in Step 2702 that the disk subsystem 100 has shifted to the reliability-first mode from the power saving-first mode, the monitoring program 212 judges that the time to boot up has arrived for one of the other nodes 110 (Step 2705).

When it is judged in Step 2702 that the disk subsystem 100 has not shifted to the reliability-first mode from the power saving-first mode, the monitoring program 212 judges whether or not a failure has occurred in the nodes 110 that belong to a failover pair (Step 2703).

When it is judged in Step 2703 that a failure has occurred in the nodes 110 belonging to a failover pair, the monitoring program 212 judges that it is time to boot up one of the other nodes 110 (Step 2705).

When it is judged in Step S2703 that a failure has not occurred in the nodes 110 belonging to a failover pair, the monitoring program 212 judges that the time to boot up has arrived for none of the other nodes 110 (Step 2704).

As has been described, the first embodiment of this invention makes it possible to control the power consumption of a computer system in an optimum manner based on the required processing performance, reliability, power consumption amount, or the like. Specifically, power consumption can be minimized to the extent that does not sacrifice the required performance and reliability.

A second embodiment of this invention will now be described.

Figure 28:
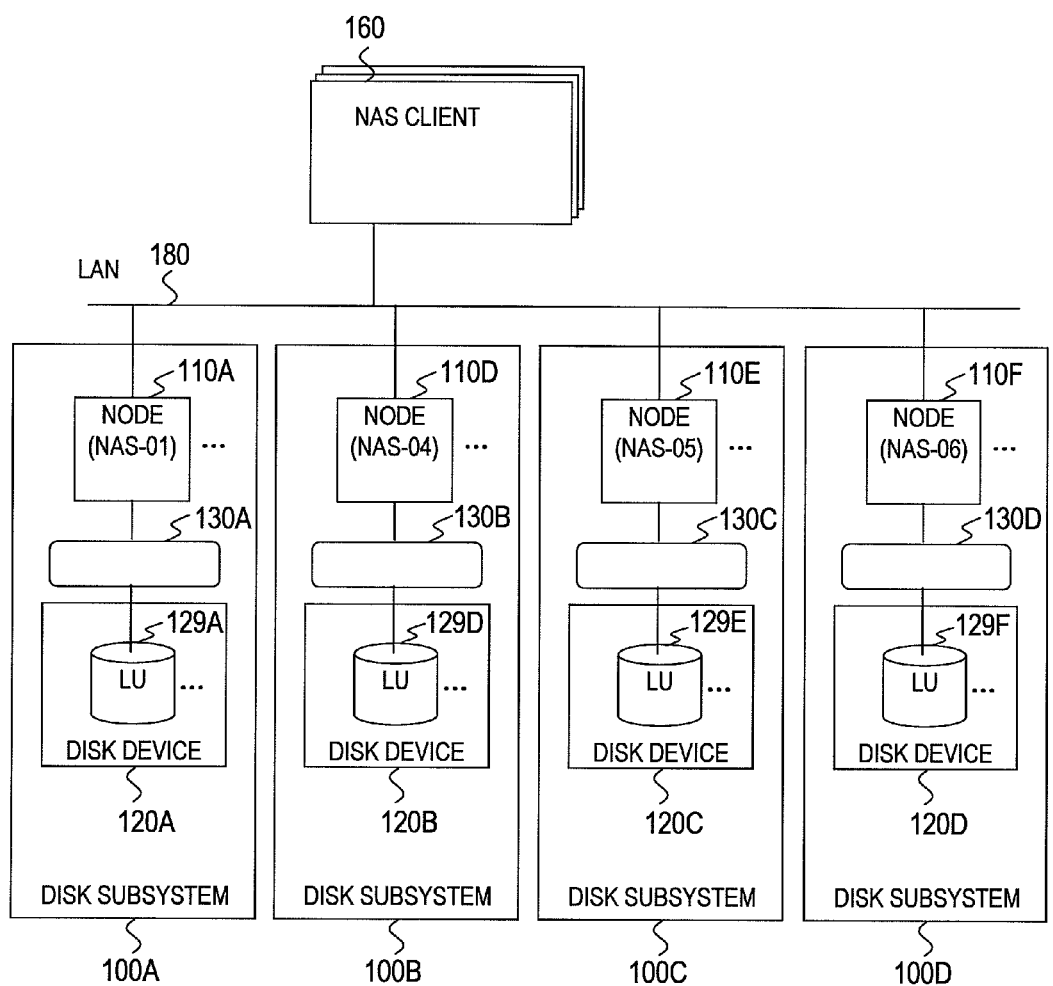
FIG. 28 is a block diagram showing a hardware configuration of a computer system according to a second embodiment of this invention.

FIG. 28 is a block diagram showing the hardware configuration of a computer system according to the second embodiment of this invention.

The computer system of this embodiment has one or more NAS clients 160 and multiple disk subsystems 100, which are connected to the NAS client(s) 160 via the LAN 180. Each of the disk subsystems 100A to 100D shown in FIG. 28 is one of the multiple disk subsystems 100.

A disk subsystem 100A corresponds to the disk subsystem 100 of FIG. 1. This means that a storage network 130A and LU 129A of FIG. 28 correspond to the storage network 130 and LU 129 of FIG. 1, respectively. A description on the disk subsystem 100A is therefore omitted. The disk controller 121 and the disk drive 128 are omitted from FIG. 28.

Disk subsystems 100B to 100D are each structured the same way as the disk subsystem 110A. This means that nodes 110D to 110F are the same as a node 110A. Storage networks 130B to 130D are the same as the storage network 130A. Disk devices 120B to 120D are the same as a disk device 120A. LUs 129D to 129F are the same as the LU 129A. Therefore, a description on the disk subsystems 100B to 100D is also omitted.

It is not necessary for each disk subsystem 100 to be contained within a single casing as mentioned in the description of FIG. 1.

The storage networks 130A to 130D are not interconnected. Accordingly, the path 301 cannot be set between one node 110 belonging to one disk subsystem 100 and one node 110 belonging to another disk subsystem 100. For instance, the node 110A cannot access the LU 129D through any of the storage networks 130.

FIG. 28 shows a single node 110 and a single LU 129 in a single disk subsystem 100, but each disk subsystem 100 can have an arbitrary number of nodes 110 and an arbitrary number of LUs 129.

Figure 29:
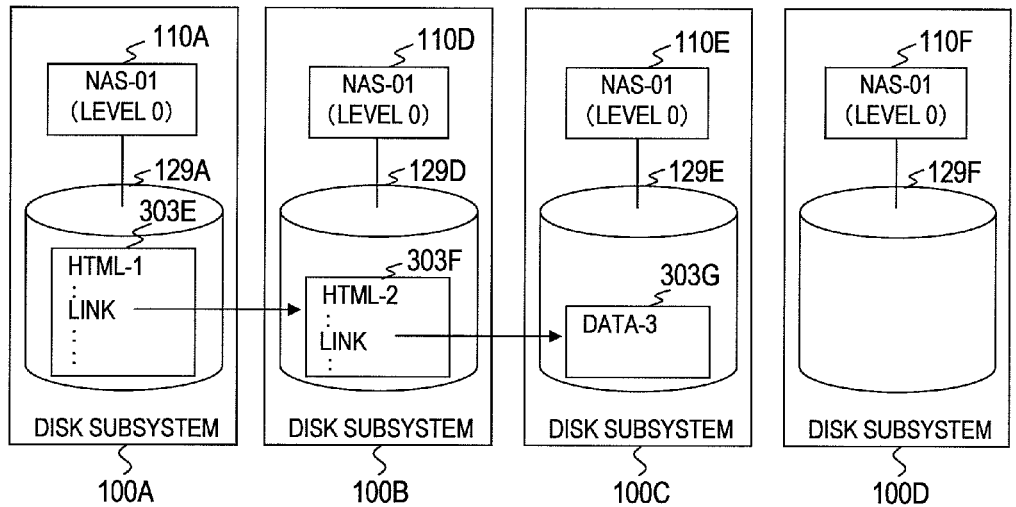
FIG. 29 is an explanatory diagram showing an example in which interrelated files are stored in different disk subsystems in the computer system according to the second embodiment of this invention.
Figure 30:
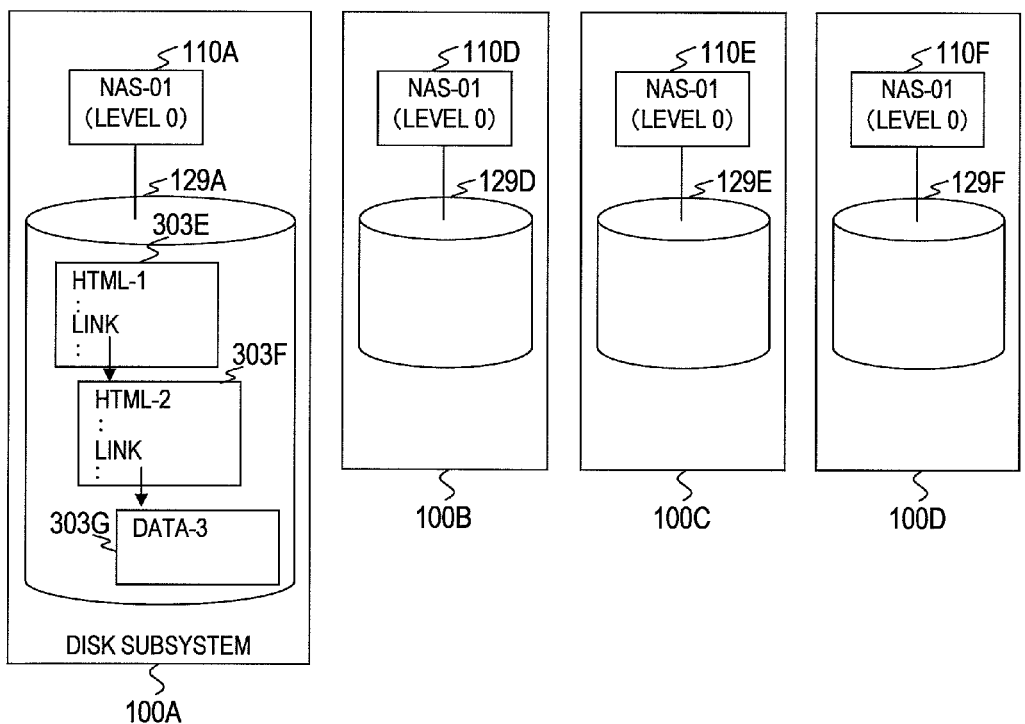
FIG. 30 is an explanatory diagram showing an example in which interrelated files are stored in the same disk subsystem in the computer system according to the second embodiment of this invention.

Next, this embodiment will be outlined with reference to FIGS. 29 and 30.

FIG. 29 is an explanatory diagram showing an example in which interrelated files are stored in different disk subsystems 100 in the computer system according to the second embodiment of this invention.

Specifically, in the example of FIG. 29, a file 303E is stored in the LU 129A of the disk subsystem 100A, a file 303F is stored in the LU 129D of the disk subsystem 100B, and a file 303G is stored in the LU 129E of the disk subsystem 100C. FIG. 29 reflects the computer system shown in FIG. 28 but omits details (for example, the storage networks 130) that are not necessary in describing the outline of the second embodiment.

An open communication path is set between the node 110A and the LU 129A. An open communication path is set between the node 110D and the LU 129D. An open communication path is set between the node 110E and the LU 129E.

The files 303E and 303F are hypertext markup language (HTML) files identified by file names "HTML-1" and "HTML-2", respectively. The file 303G is a data file identified by a file name "DATA-1".

A link to the file 303F is embedded in the file 303E. A link to the file 303G is embedded in the file 303F. In some cases, access to the file 303F by the node 110A generates the need to access the file 303F, and access to the file 303F in turn may generate the need to access the file 303G.

When it is possible to set the open communication path 301 between the node 110A and the LU 129D, the node 110A can access the file 303F within the LU 129D through the path 301. However, as described above, setting the open communication path 301 between the node 110A and the LU 129D is not possible. The node 110A therefore has to access the file 303F via the node 110D.

The node 110A can access the file 303F via the node 110D while the node 110D is in operation. When the node 110D is in a power saving mode, on the other hand, the node 110A needs to boot up the node 110D (in other words, needs to shift the node 110D to the operational mode). Access to the file 303F is accordingly delayed by the length of time necessary to boot the node 110D.

A similar problem also arises when the file 303G is accessed while the node 110E is in a power saving mode.

This problem becomes more serious as the level number of the power saving level set to the node 110 ascends, for setting a higher power saving level (in other words, cutting power consumption more) prolongs the time necessary for the node 110 to return from a power saving mode to the operational mode as shown in FIG. 4.

In the example of FIG. 29, the power saving levels 1, 2, and 3 are set to the nodes 110D, 110E, and 110F, respectively. In this case, the time necessary to return to the operational mode is longer for the node 110E than the node 110D, and it takes even longer for the node 110F to return to the operational mode.

FIG. 30 is an explanatory diagram showing an example in which interrelated files are stored in the same disk subsystem 100 in the computer system according to the second embodiment of this invention.

When multiple files 303 with links set to one another are stored in different disk subsystems 100 as shown in FIG. 29, access delay can be avoided by moving those files 303 to the LU 129 that can be accessed by the operating node 110 through the path 301.

In the example of FIG. 30, the files 303F and 303G are both stored in the same LU 129 that stores the file 303E, namely, the LU 129A. Then the node 110A can access the files 303E to 303G through the path 301 set open for communication.

Figure 31:
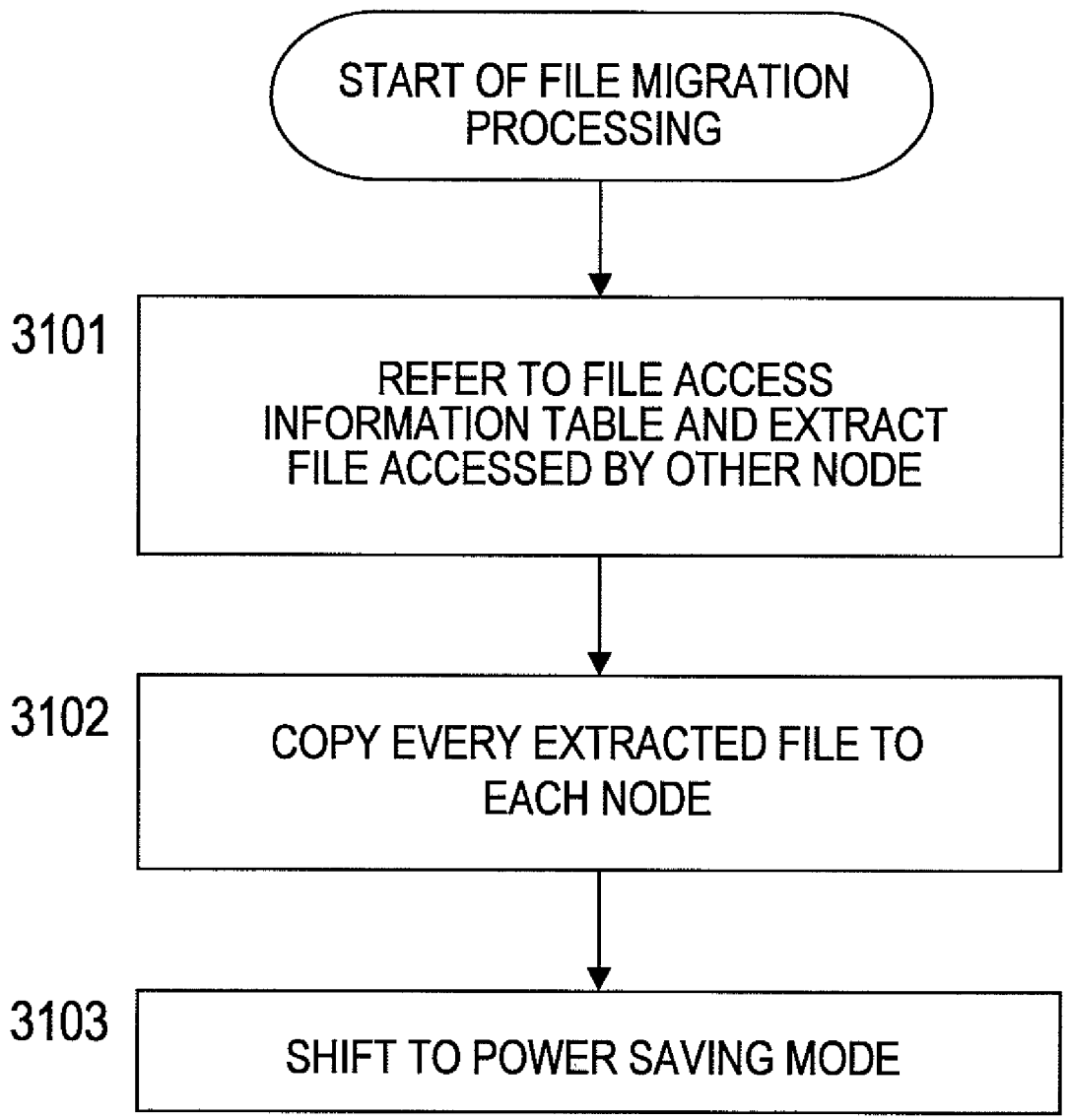
FIG. 31 is a flow chart of processing that is executed by the monitoring program to move the files according to the second embodiment of this invention.

FIG. 31 is a flow chart of processing that is executed by the monitoring program 212 to move the files 303 according to the second embodiment of this invention.

The monitoring program 212 of this embodiment executes, in addition to the processing of the monitoring program 212 of the first embodiment which is shown in FIGS. 20 and 25 to 27, file migration processing shown in FIG. 31. This file migration processing is processing of moving multiple files 303 that are stored in different disk subsystems 100 with links set to one another as shown in FIG. 29 to the LU 129 within a single disk subsystem 100 as shown in FIG. 30.

First, the monitoring program 212 extracts from the file access information table 1700 the file 303 that has been accessed by other nodes 110 (Step 3101).

For example, in the case where the node 110D holds the file access information table 1700 shown in FIG. 17, the monitoring program 212 of the node 110D looks up an entry of the file access information table 1700 that holds the identifier of the other node 110A, namely, "NAS-01", in its access source field 1704, and extracts a value "mnt/FS2/HTML-2.html" from the file field 1701 of this entry. The entry shows that the file 303F, which is identified by a file name "HTML-2.html", has been accessed by the other node 110A. This implies a strong possibility of there being some relation (e.g., links set to each other) between one of the files 303 that are accessible to the node 110A and one of the files 303 that are accessible to the node 110D.

Accordingly, the monitoring program 212 next copies the file 303 extracted in Step 3101 to the access source node 110 (Step 3102). In the example of FIG. 17, the monitoring program 212 of the node 110D sends a request to make a copy of the file 303F to the node 110A. As a result, the file 303F is copied to the LU 129 that the node 110A can access through the path 301 (e.g., the LU 129A shown in FIG. 30). The created copy of the file 303F is denoted as file 303F in FIG. 30.

After the copying is completed, the file 303F may or may not be deleted from the LU 129D.

The monitoring program 212 next shifts the own node 110 to a power saving mode (Step 3103).

The above file migration processing may be executed in Step 2004 of FIG. 20 or Step 2506 of FIG. 25. Alternatively, the file migration processing may be executed by the monitoring program 212 of the individual node 110 at given timings (regularly, for example).

In the case where the file migration processing is executed in Step 2004 or 2506, the monitoring program 212 may judge whether to make a copy based on a power saving level to which the own node 110 is to be shifted. Specifically, the monitoring program 212 judges to what power saving level the own node 110 is to be shifted before executing Step 3101. When it is judged as a result that the own node 110 is to shift to the power saving level 3, the monitoring program 212 executes Steps 3101 to 3103. When it is judged as a result that the own node 110 is to shift to the power saving level 1 or 2, the monitoring program 212 executes Step 3103 skipping Steps 3101 and 3102.

Limitations imposed by the specification (e.g., storage capacity) of the nodes 110 could make it impossible to put related files 303 together under management of one node 110 as shown in FIG. 30. In such cases, it is desirable to arrange the files 303 in a manner that minimizes the adverse effect of access delay.

As an example, a description will be given of a case where a link to the file 303F is embedded in the file 303E and a link to the file 303G is embedded in the file 303F as shown in FIG. 29. Accessing the file 303E in this case does not necessarily cause the file 303F to be accessed. Similarly, accessing the file 303F does not always result in the file 303G being accessed. Therefore, unless the file 303F and the file 303G are accessed independently of each other, the file 303E is accessed most whereas the file 303G is accessed least frequently.

In this case, placing the file 303 that is accessed less frequently under management of the node 110 that is set to a higher power saving level minimizes the adverse effect of access delay. For instance, as shown in FIG. 29, the file 303E which is accessed most is placed under management of the node 110A which is in operation, the file 303F which has the second-highest access frequency is placed under management of the node 110D which is set to the power saving level 1, and the file 303G which is accessed least frequently is placed under management of the node 110E which is set to the power saving level 2.

The time required for the node 110E to boot up in this case is longer than the time required for the node 110D to boot up. However, since the node 110E is required to boot up less frequently than the node 110D, access delay is caused not so frequently.

As has been described, according to the second embodiment of this invention, multiple files 303 with links set to each other can be stored together in a single disk subsystem 100. This eliminates the need to boot up the node 110 that is in a power saving mode when the files 303 are accessed by following links. Accordingly, access delay is prevented and an increase in power consumption as a result of booting up the node 110 is avoided.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
a plurality of computers; and
a first storage device coupled to the plurality of computers via a first network,
wherein the plurality of computers include a first computer, a second computer, and a third computer,
wherein the first computer has a first interface coupled to the first network, a first processor coupled to the first interface, and a first memory coupled to the first processor,
wherein the second computer has a second interface coupled to the first network, a second processor coupled to the second interface, and a second memory coupled to the second processor,
wherein the third computer has a third interface coupled to the first network, a third processor coupled to the third interface, and a third memory coupled to the third processor, wherein the first storage device has a plurality of storage areas for storing data written by the plurality of computers and a first controller for controlling data write and data read in the plurality of storage areas, wherein the plurality of storage areas include a first storage area, wherein the first computer accesses data within the first storage area via the first network, wherein the computer system holds load information containing values of load on the plurality of computers and settings information indicating a mode set to the computer system, wherein the first computer is configured to:

cut, in the case where the settings information indicates a first mode and the load on the first computer is lower than both the load on the second computer and the load on the third computer, at least a part of electric power supplied to the first processor, the first memory, and the first interface;

cut, in the case where the settings information indicates a second mode and the load on the first computer is lower than at least one of the load on the second computer and the load on the third computer, the at least a part of electric power supplied to the first processor, the first memory, and the first interface; and send, before cutting the at least a part of electric power supplied to the first processor, the first memory, and the first interface, a takeover request to the second computer, and wherein, after receiving the takeover request, the second computer accesses the data within the first storage area via the first network, said system further comprising:

a fourth computer coupled to the plurality of computers via a second network; and a second storage device coupled to the fourth computer via a third network, wherein the fourth computer has a fourth interface coupled to the third network, a fourth processor coupled to the fourth interface, and a fourth memory coupled to the fourth processor, wherein the second storage device has a second storage area for storing data written by the fourth computer and a second controller for controlling data write and data read in the second storage area, wherein, upon receiving a request from the first computer to access first data within the second storage area, the fourth computer accesses the first data within the second storage area via the third network, wherein the fourth computer sends a request to make a copy of the first data to the first computer, and wherein, upon receiving the request to make a copy of the first data, the first computer stores a copy of the first data in the first storage area.

2. A method of controlling a computer system that has a plurality of computers and a first storage device coupled to the plurality of computers via a first network, the plurality of computers including a first computer, a second computer, and a third computer, the first computer having a first interface coupled to the first network, a first processor coupled to the first interface, and a first memory coupled to the first processor, the second computer having a second interface coupled to the first network, a second processor coupled to the second interface, and a second memory coupled to the second processor, the third computer having a third interface coupled to the first network, a third processor coupled to the third interface, and a third memory coupled to the third processor, the first storage device having a plurality of storage areas for storing data written by the plurality of computers and a first controller for controlling data write and data read in the plurality of storage areas, the plurality of storage areas including a first storage area, the computer system holding load information containing values of load on the plurality of computers and settings information indicating a mode set to the computer system, the method comprising the steps of:

accessing, by the first computer, data within the first storage area via the first network;

cutting, in the case where the settings information indicates a first mode and the load on the first computer is lower than both the load on the second computer and the load on the third computer, at least a part of electric power supplied to the first processor, the first memory, and the first interface;

cutting, in the case where the settings information indicates a second mode and the load on the first computer is lower than at least one of the load on the second computer and the load on the third computer, the at least a part of electric power supplied to the first processor, the first memory, and the first interface;

sending, by the first computer, before cutting the at least a part of electric power supplied to the first processor, the first memory, and the first interface, a takeover request to the second computer; and accessing, by the second computer, after the takeover request is received, the data within the first storage area via the first network, wherein the computer system further includes a fourth computer coupled to the plurality of computers via a second network, and a second storage device coupled to the fourth computer via a third network, wherein the fourth computer has a fourth interface coupled to the third network, a fourth processor coupled to the fourth interface, and a fourth memory coupled to the fourth processor, wherein the second storage device has a second storage area for storing data written by the fourth computer and a second controller for controlling data write and data read in the second storage area, wherein the method further comprises the steps of:

accessing, by the fourth computer, upon receiving a request from the first computer to access first data within the second storage area, the first data within the second storage area via the third network;

sending, by the fourth computer, a request to the first computer to make a copy of the first data; and storing, by the first computer, a copy of the first data in the first storage area upon reception of the request to make a copy of the first data.

* * * * *